US008648948B2

(12) United States Patent
Rafferty et al.

(10) Patent No.: US 8,648,948 B2
(45) Date of Patent: Feb. 11, 2014

(54) IMAGING SYSTEMS WITH MULTIPLE IMAGING PIXEL TYPES AND RELATED METHODS

(75) Inventors: Conor S. Rafferty, Newton, MA (US); Clifford A. King, Gloucester, MA (US); Michael Philip Decelle, Rumson, NJ (US); Jason Y. Sproul, Watertown, MA (US); Bryan D. Ackland, Old Bridge, NJ (US)

(73) Assignee: Infrared Newco, Inc., Tucson, AZ (US)

( * ) Notice: Subject to any disclaimer, the term of this patent is extended or adjusted under 35 U.S.C. 154(b) by 277 days.

(21) Appl. No.: 12/570,679

(22) Filed: Sep. 30, 2009

(65) Prior Publication Data

US 2011/0074995 A1 Mar. 31, 2011

(51) Int. Cl.
*H04N 5/335* (2011.01)
(52) U.S. Cl.
USPC ........... 348/308; 348/272; 348/273; 348/274; 348/275; 348/276
(58) Field of Classification Search
None
See application file for complete search history.

(56) References Cited

U.S. PATENT DOCUMENTS

| | | | | |
|---|---|---|---|---|
| 6,914,314 B2* | 7/2005 | Merrill et al. | .................. | 257/440 |
| 7,768,569 B2* | 8/2010 | Kozlowski | .................... | 348/340 |
| 8,031,243 B2* | 10/2011 | Imai et al. | ...................... | 348/278 |
| 2004/0089788 A1* | 5/2004 | Oda et al. | .................... | 250/208.1 |
| 2004/0125226 A1* | 7/2004 | Kubo | ............................ | 348/340 |
| 2005/0212939 A1 | 9/2005 | Oda et al. | | |
| 2006/0023312 A1* | 2/2006 | Boettiger et al. | ............. | 359/619 |
| 2006/0103744 A1* | 5/2006 | Nam | .............................. | 348/272 |
| 2007/0040100 A1* | 2/2007 | Zarnowski et al. | ........ | 250/208.1 |
| 2008/0211945 A1* | 9/2008 | Hong et al. | ..................... | 348/294 |
| 2009/0180015 A1* | 7/2009 | Nakamura | ..................... | 348/308 |
| 2009/0200469 A1* | 8/2009 | Morin et al. | ............... | 250/338.1 |
| 2009/0272880 A1* | 11/2009 | Stanton et al. | ............. | 250/208.1 |
| 2009/0290043 A1* | 11/2009 | Liu et al. | ..................... | 348/223.1 |
| 2010/0013042 A1* | 1/2010 | Kim | ................. | 257/458 |
| 2010/0013969 A1* | 1/2010 | Ui | .................. | 348/294 |
| 2010/0178018 A1* | 7/2010 | Augusto | ....................... | 385/131 |
| 2010/0309349 A1* | 12/2010 | Kozlowski | ..................... | 348/273 |

OTHER PUBLICATIONS

Chamberlain, S. G. et al., "A Novel Wide Dynamic Range Silicon Photodetector and Linear Imaging Array," *IEEE Journal Solid-State Circuits*, SC-19(1):41-48 (Feb. 1984).
Decker, S. et al., "A 256 × 256 CMOS Imaging Array with Wide Dynamic Range Pixels and Column-Parallel Digital Output". *IEEE Journal Solid-State Circuits*, 33(12):2081-2091 (Dec. 1998).
Stoppa, D. et al., "Novel CMOS Image Sensor with a 132-dB Dynamic Range," *IEEE Journal Solid-State Circuits*, 37(12): 1846-1852 (Dec. 2002).

* cited by examiner

*Primary Examiner* — Lin Ye
*Assistant Examiner* — John H Morehead, III
(74) *Attorney, Agent, or Firm* — Wolf, Greenfield & Sacks, P.C.

(57) ABSTRACT

Imaging arrays comprising at least two different imaging pixel types are described. The different imaging pixel types may differ in their light sensitivities and/or light saturation levels. Methods of processing the output signals of the imaging arrays are also described, and may produce images having a greater dynamic range than would result from an imaging array comprising only one of the at least two different imaging pixel types.

30 Claims, 12 Drawing Sheets

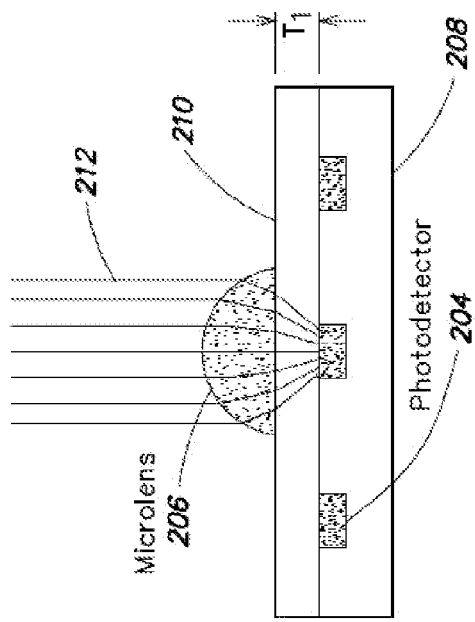
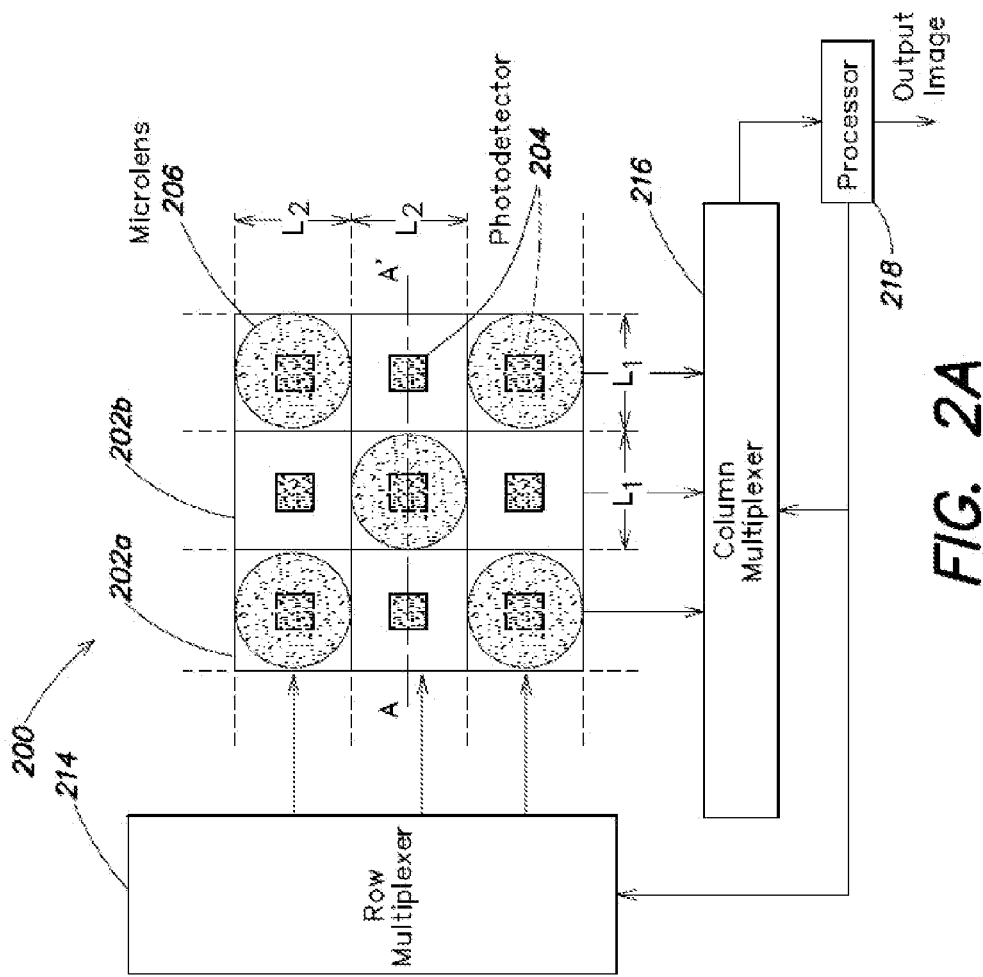
FIG. 2B
FIG. 2A

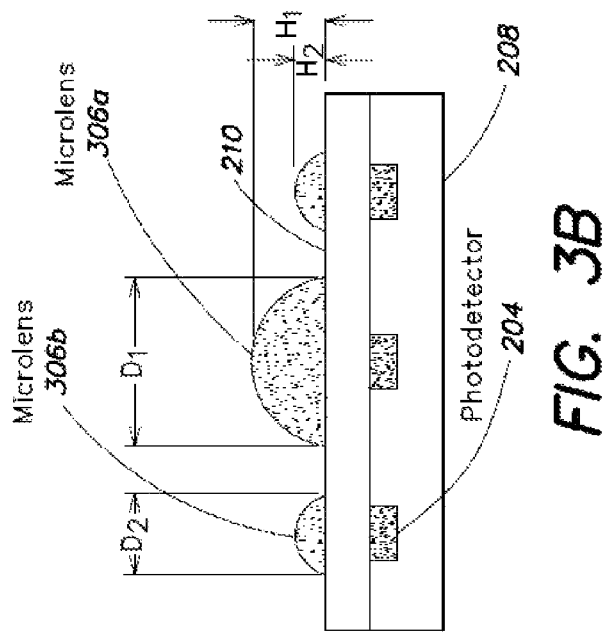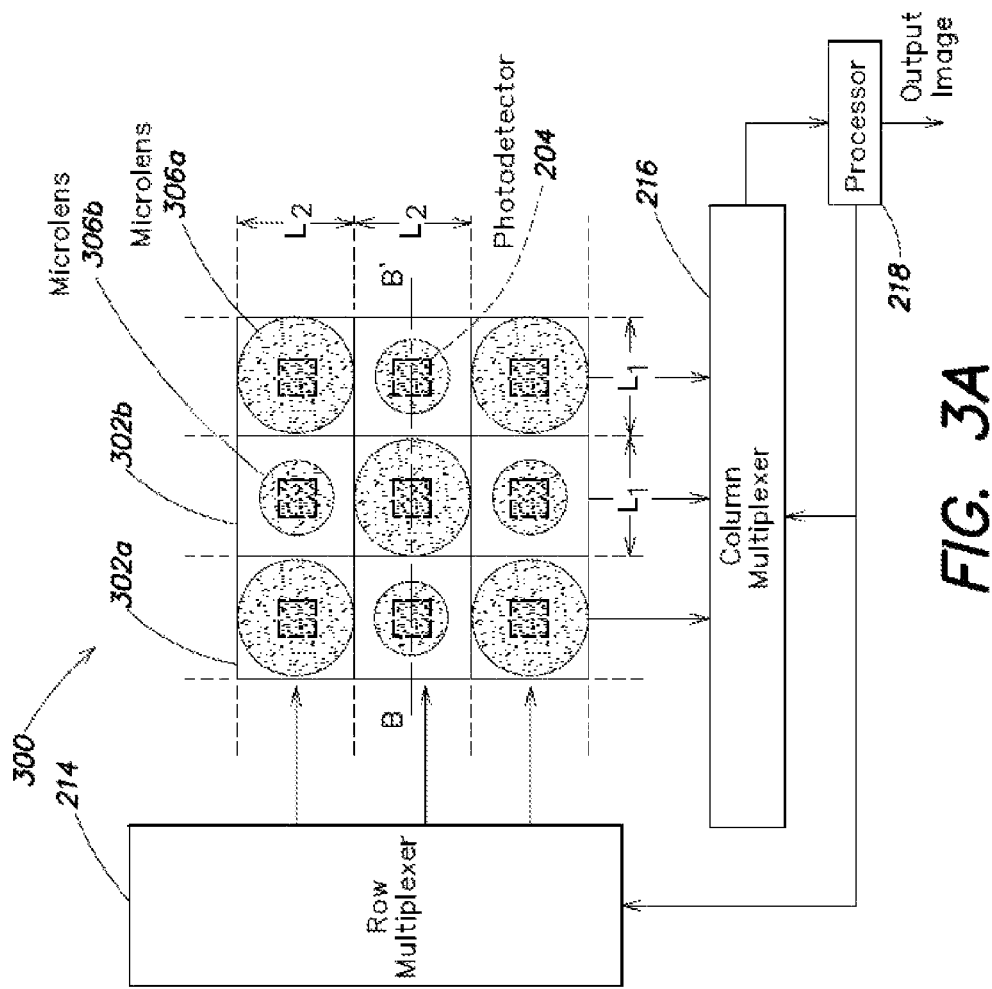
FIG. 3B
FIG. 3A

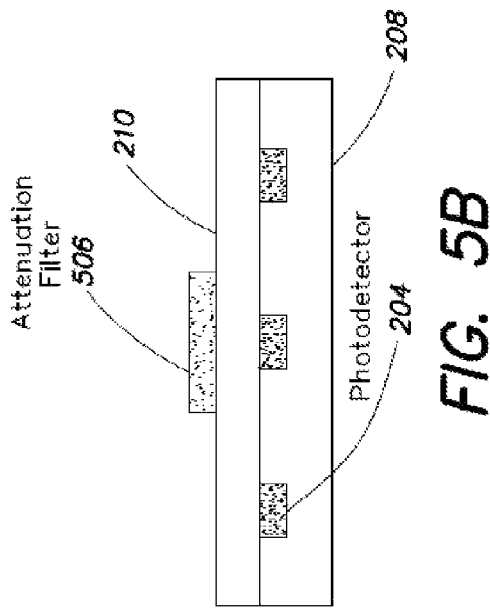
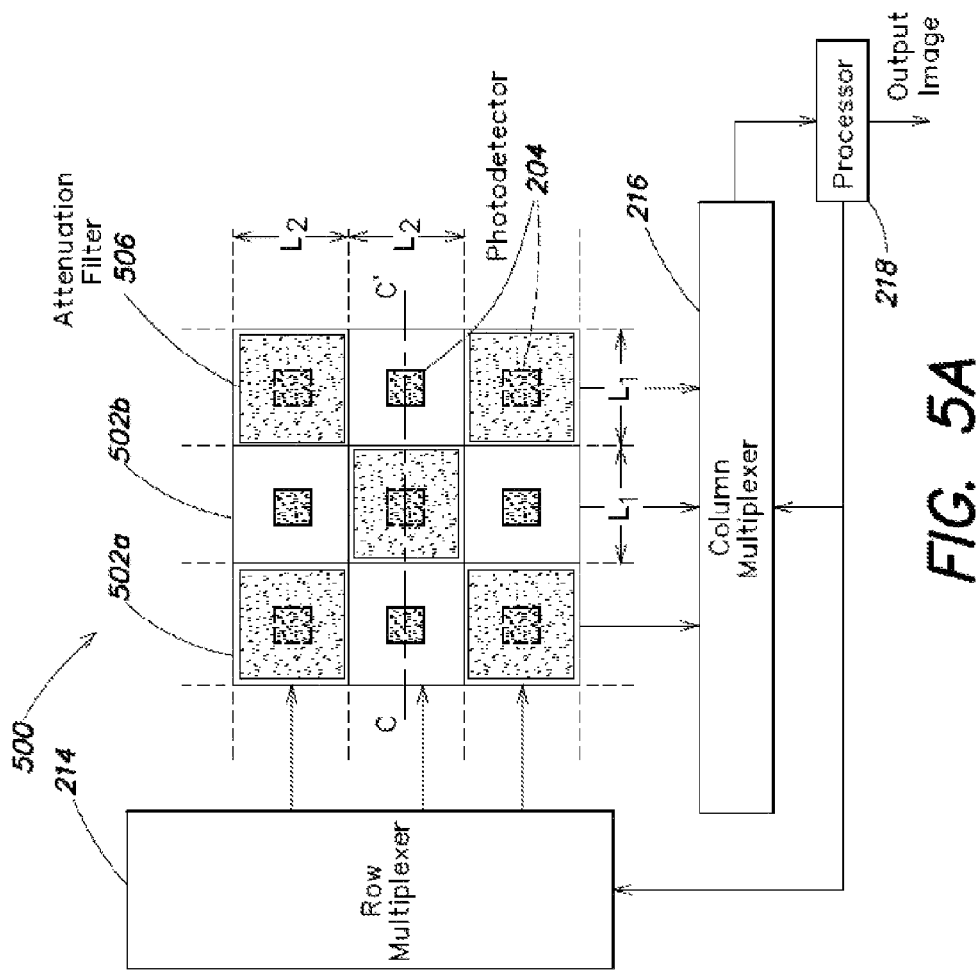
FIG. 5B
FIG. 5A

IMAGING SYSTEMS WITH MULTIPLE IMAGING PIXEL TYPES AND RELATED METHODS

BACKGROUND

Solid state image sensors ("imagers") comprise a two-dimensional array of imaging pixels in combination with control and readout circuitry. The imaging pixels detect incident radiation and produce output signals. The control and readout circuitry reads the output signals and processes them to produce an image.

FIG. 1 illustrates the layout of an imaging array 100 of an imager having nine imaging pixels 102a-102i arranged in three rows (i−1; i+1) and three columns (j−1; j; j+1). Each of the imaging pixels 102a-102i includes a photodetector 104, which produces an output signal in response to receiving incident radiation. As mentioned, the output signals are read out and processed by control and readout circuitry (not shown) to produce an image.

The performance of an imager may be characterized by various metrics, one of which is the dynamic range. The dynamic range of an imager is a measure of the maximum optical signal (where the optical signal refers to light intensity) the imaging pixels can detect during an integration period before saturating (referred to herein as the "light saturation level") compared to the minimum optical signal the imaging pixels can detect, and thus represents the ability of an imager to accurately portray both bright and dark areas in an image. An imager with a relatively high dynamic range saturates at a relatively large optical signal compared to the minimum optical signal it can detect, and therefore may be able to produce images that more accurately portray scenes with high contrast (i.e., bright and dark areas) than an imager with a relatively lower dynamic range.

SUMMARY

Methods and apparatus for imaging systems are described.

According to one aspect of the invention, an array of imaging pixels is provided, comprising a plurality of imaging pixels comprising imaging pixels of at least two types, the at least two types comprising a first type and a second type. The imaging pixels of the first type are configured to have a greater light sensitivity than the imaging pixels of the second type. The imaging pixels of the first type and the second type comprise photodetectors that are substantially the same as each other and are integrated on a same substrate.

According to another aspect of the invention, a camera is provided, comprising an imaging array, readout circuitry coupled to the imaging array and configured to read out signals from the imaging array indicative of radiation incident on the imaging array, and processing circuitry configured to process the signals to form imaging data. The imaging array comprises a plurality of imaging pixels comprising imaging pixels of at least two types, the at least two types comprising a first type and a second type. The imaging pixels of the first type are configured to have a greater light sensitivity and a lower light saturation level than the imaging pixels of the second type. The imaging pixels of the first type and the second type comprise photodetectors that are substantially the same as each other and are integrated on a same substrate.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Description of various aspects and embodiments of the invention will be given by reference to the following drawings. The drawings are not necessarily drawn to scale. Each identical or nearly identical component illustrated in multiple drawings is illustrated by a like numeral.

FIGS. 2A and 2B are a plan view and a cross-section, respectively, of a portion of an imager having different types of imaging pixels with different optical fill factors, according to one non-limiting embodiment.

FIGS. 3A and 3B are a plan view and a cross-section, respectively, of a portion of an alternative imager to that of FIGS. 2A and 2B, having different types of imaging pixels with different optical fill factors, according to one non-limiting embodiment.

FIGS. 5A and 5B are a plan view and a cross-section, respectively, of a portion of an alternative imager having different types of imaging pixels with different optical fill factors, according to one non-limiting embodiment.

DETAILED DESCRIPTION

Figure 1:
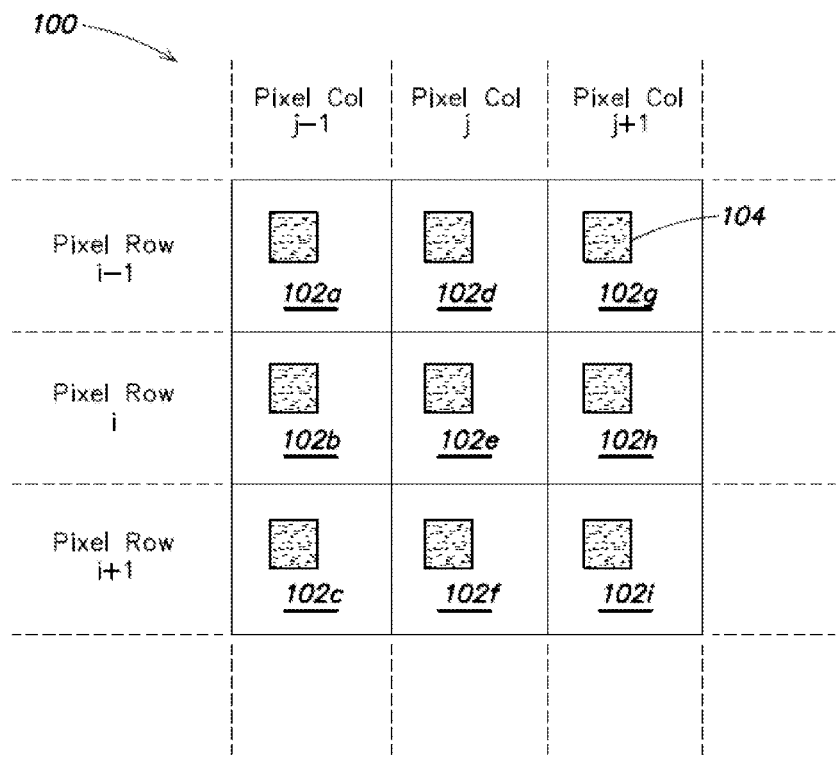
FIG. 1 is a schematic layout of an imaging array of a conventional imager.

Applicants have appreciated that conventional attempts to increase the dynamic range of imagers negatively impacted other characteristics of the imagers. For example, conventional attempts resulted in lower signal-to-noise ratios (SNR), higher power consumptions, increased imaging pixel layout complexity, and/or decreased light sensitivity (i.e., an increase in the minimum optical signal the imager can detect).

Aspects of the invention are directed to techniques to provide imagers with a desirable dynamic range. In some embodiments, imagers are provided including imaging pixels having different degrees of light sensitivity despite using photodetectors that are substantially the same to facilitate fabrication. In some embodiments, imagers are provided including imaging pixels having different light saturation levels despite using photodetectors that are substantially the same. In some embodiments, imagers are provided including imaging pixels having both different degrees of light sensitivity and different light saturation levels, despite using photodetectors that are substantially the same.

In some embodiments, the difference in light sensitivity and/or light saturation level between imaging pixel types results from structural differences between the imaging pixel types in areas other than the photodetectors. In some such embodiments, imaging pixels of different types may have substantially the same shape and/or area, despite the structural differences, such that imaging pixel design, layout, and fabrication may be simple and cost effective. In some embodiments, imagers according to one or more aspects described herein may exhibit a high dynamic range, for example having a dynamic range of between approximately 10 and 30 dB or more greater than conventional imagers.

According to one embodiment, the difference in light sensitivity and/or light saturation level between different imaging pixel types of an imager results from the pixel types exhibiting different optical fill factors. The different optical fill factors can be accomplished in any suitable way, and in some embodiments results from the different imaging pixel types having different microlens structures, different filter structures, and/or different light shield structures (also referred to herein as light blocking masks or layers).

In another embodiment, the difference in light sensitivity and/or light saturation level between different imaging pixel types of an imager results from a structural difference between photocharge storage capacitors of the different imaging pixel types, which may be accomplished in any suitable manner. In one embodiment, the structural difference may result from the different imaging pixel types including different numbers of capacitors configured to store photocharge generated by a photodetector of the imaging pixel.

According to another embodiment, the difference in light sensitivity and/or light saturation level between different imaging pixel types of an imager results from the different imaging pixels types exhibiting different optical fill factors and having a structural difference between photocharge storage capacitors.

Other manners of producing imaging pixels types having different light sensitivities and/or light saturation levels are also possible, as the examples listed above are provided primarily for purposes of illustration and are not limiting of the various aspects of the invention.

According to some aspects of the invention, the different imaging pixel types of an imager are arranged into sub-arrays, which in some embodiments have different light sensitivities and/or light saturation levels, and the output signals of the sub-arrays are processed to produce multiple images of a scene. The signals may be processed in any suitable manner, as the various aspects of the invention described herein relating to processing output signals of sub-arrays of an imaging array are not limited to any particular manner of processing. In one non-limiting embodiment, the multiple images may be processed to form a combined (or "resulting") image in one of various manners, as will be described further below. According to one embodiment, a first sub-array of imaging pixels exhibits a lower degree of light sensitivity (i.e., is less sensitive) but a greater light saturation level than a second sub-array, such that an image formed from output signals of the first sub-array may more accurately represent bright areas of a scene while an image produced from output signals of the second sub-array may more accurately portray dark areas of the scene. Suitably combining the images of the sub-arrays may therefore accurately portray both the bright areas and dark areas of the scene.

Imaging Sub-Arrays with Different Optical Fill Factors

According to one aspect of the invention, an imager comprises two or more imaging pixel types exhibiting different optical fill factors while having photodetectors that are substantially the same. According to one aspect, photodetectors that are substantially the same are formed of the same material(s), have substantially the same surface area to receive radiation (e.g., within manufacturing tolerances, for example the surface areas of different photodetectors may be within 5% of each other), and have substantially the same shape. In some embodiments, they may also have substantially the same depth. The optical fill factor of an imaging pixel is the ratio of the amount of light incident on the photodetector of the imaging pixel to the amount of light incident on the imaging pixel. Conventionally, as shown in FIG. 1, photodetectors have a smaller area than the imaging pixels, and therefore the optical fill factor of conventional imaging pixels is less than 1 (or less than 100% when expressed as a percentage). The optical fill factor may impact the light sensitivity and/or light saturation level of an imaging pixel, and therefore those embodiments in which different imaging pixel types have different optical fill factors may also result in the imaging pixel types exhibiting different degrees of light sensitivity and/or different light saturation levels.

According to some embodiments in which an imager comprises an imaging array including two or more imaging pixel types exhibiting different optical fill factors, the differing optical fill factors may be achieved using different microlens structures for the different imaging pixel types. FIGS. 2A, 2B, 3A, 3B, and 4 illustrate examples.

FIGS. 2A and 2B are a plan view and a cross section, respectively, of a portion 200 of an imager having two different imaging pixel types which exhibit different optical fill factors. Nine imaging pixels are shown in FIG. 2A, but it should be appreciated that the concepts described herein may apply to imaging arrays including hundreds, thousands, or millions of imaging pixels, or any other suitable number of imaging pixels. As shown in FIG. 2A, the portion 200 of the imager comprises two imaging pixel types, 202a and 202b. Both types of imaging pixel include a photodetector 204 and occupy substantially the same area ($L_1 \times L_2$; where $L_1$ and $L_2$ may each be, for example, 10 microns, or any other suitable values and need not be the same value as each other in all embodiments). The imaging pixels 202a include a microlens 206 while imaging pixels 202b do not.

The microlenses 206 may collect and focus incident radiation onto the respective underlying photodetectors 204 (as shown in FIG. 2B), thus giving the imaging pixels 202a a greater optical fill factor than they would have absent the microlenses 206, assuming all other aspects of the imaging pixel are the same (as in one embodiment). Thus, the photodetectors 204 of imaging pixels 202a may receive more radiation than the photodetectors 204 of imaging pixels 202b for a same amount of radiation incident uniformly on the portion 200 of the imager, and therefore the imaging pixels 202a may have a greater optical fill factor and be more sensitive to radiation incident on the pixel than the imaging pixels 202b (i.e., imaging pixels 202a may produce a measurable output signal for a smaller incident optical signal than can imaging pixels 202b). At the same time, because the photodetectors 204 of imaging pixels 202a may receive more incident radiation than photodetectors 204 of imaging pixels 202b for a same amount of radiation uniformly incident on the portion 200 when all other aspects of the pixels are the same (as in one embodiment), the imaging pixels 202a may have a lower light saturation level than the imaging pixels 202b.

The quantitative difference between the light sensitivity and/or light saturation level of imaging pixels 202a and imaging pixels 202b may depend at least partially upon the design of the microlenses 206. Therefore, the microlenses 206 may be designed to provide a desired difference in light sensitivity and/or light saturation level between the imaging pixels 202a and 202b, and accordingly may have any suitable size, shape, material, and spacing/positioning relative to the corresponding photodetector to provide the desired difference. Therefore, in some embodiments, the microlenses 206 are not limited to having any particular size, shape, material or spacing/positioning.

For example, the microlenses may be made of photoresist (e.g., MFR-401 series of photoresists, available from JSR Micro of Tokyo, Japan), or any other material providing a suitable index of refraction. In some embodiments, the microlenses may be substantially hemispherical, have a substantially circular footprint (proximate the photodetector 204), be substantially square (e.g., substantially the shape of the imaging pixel in one embodiment), or have any other suitable shape. The microlens may have an area smaller than the imaging pixel, the same size as the imaging pixel, or larger than the imaging pixel (as described further below), and is not limited in this respect. In some embodiments, the microlenses may have a substantially circular footprint with a diameter between approximately 2-15 microns, although other values are also possible.

In FIG. 2A, the two different imaging pixel types are arranged in a checkerboard pattern to form two sub-arrays. As will be described in greater detail below, in some embodiments the output signals of the imaging pixels may be processed to form different images of a same scene, corresponding to the different sub-arrays. However, the various aspects described herein are not limited to any particular manner of processing the output signals of the different imaging pixel types, and are not limited to arranging the different imaging pixel types in any particular sub-array pattern, as the illustrated checkerboard pattern is only one non-limiting example.

FIG. 2A further illustrates that the portion 200 comprises control and readout circuitry comprising a row multiplexer 214 and column multiplexer 216. The row multiplexer may be coupled to the array of imaging pixels 202a and 202b to select a row of imaging pixels from which to read the output signals. The column multiplexer may be coupled to the imaging pixels to receive the output signals of the imaging pixels selected by the row multiplexer, and to provide the output signals directly, or after some pre-processing in some embodiments (e.g., buffering, amplifying, and/or filtering, etc.), to a processor 218. The processor 218 (which may be more than one processor, as described further below) may form one or more images from the output signals in any suitable manner, and may in some embodiments employ one or more of the interpolation and combination techniques described further below. It should be appreciated that the examples of multiplexing and processing circuitry illustrated are non-limiting, and that any suitable types and/or forms of circuitry may be coupled to any of the imaging arrays described herein (including those described above and below) to read out and process the output signals of the imaging pixels.

For example, it should be appreciated that the processing circuitry, such as processor 218 in the non-limiting of FIG. 2A, can be implemented in any of numerous ways. For example, the processor may be implemented using hardware, software or a combination thereof. When implemented in software, the software code can be executed on any suitable processor (e.g., processor 218) or collection of processors, whether provided in a single computer or distributed among multiple computers. It should be appreciated that any component or collection of components that perform the functions described above and further below with respect to processing output signals of the imaging arrays described herein can be generically considered as one or more controllers that control the discussed processing functions. The one or more controllers can be implemented in numerous ways, such as with dedicated hardware, or with general purpose hardware (e.g., one or more processors) that is programmed using microcode or software to perform the processing functions recited.

FIG. 2B illustrates a cross section of the portion 200 of an imager taken along the line A-A' from FIG. 2A. As shown, the imager may include a substrate 208 on, or in, or partially within which the photodetectors 204 are formed. A passivation layer 210, such as an oxide layer (e.g., silicon dioxide) or any other suitable passivation layer, may be formed on the substrate and photodetectors 204, and may have a thickness of $T_1$, or any other suitable thickness. The microlenses 206 may be formed on the passivation layer 210, and as shown may focus incident radiation 212 (e.g., visible radiation, near infrared radiation, short wavelength infrared radiation (SWIR), or any other radiation of interest) onto a corresponding underlying photodetector 204. Thus, in some non-limiting embodiments, the photodetectors 204 and microlenses 206 of the array of imaging pixels are integrated on a same substrate, all of which may form a monolithic structure in some embodiments. However, it should be appreciated that the various aspects of the invention described herein relating to the use of microlenses are not limited to the microlenses being formed on a passivation layer or being integrated with a substrate, but rather other ways of forming and positioning the microlenses are also possible.

The thickness of the passivation layer $T_1$ may have any suitable value, and may serve in some embodiments as a degree of freedom for controlling the optical fill factor of the imaging pixels (e.g., by controlling the distance between the photodetector and the microlens). For example, adjusting $T_1$ may adjust the positioning of the microlens 206 with respect to the underlying photodetector 204, which may impact the amount of radiation incident on the photodetector and therefore the optical fill factor of the imaging pixel. Accordingly, the thickness $T_1$ may be selected in some embodiments to provide a desired fill factor of the imaging pixels including microlenses 206, and therefore a desired light sensitivity and/or light saturation level. It should also be appreciated that any number of passivation layers (including zero) may be used, and that FIG. 2B illustrates only one non-limiting example.

The structures illustrated in FIG. 2B may be formed of any suitable materials. As an example, the substrate 208 may comprise silicon (e.g., single crystal silicon or polycrystalline silicon), or any other suitable substrate material. The photodetectors 204 may comprise silicon, germanium (which, in some embodiments, may be substantially pure germanium (e.g., germanium that is at least 95% pure)), silicon-germanium, or any other suitable photodetector material. The microlenses 206 may be formed of photoresist (e.g., the MFR-401 Series of photoresists available from JSR Micro), or any other suitable material, as the various aspects described herein relating to imaging arrays including microlenses are not limited by the material(s) used to form the microlenses. Furthermore, it should be appreciated that the listed materials for the various components illustrated in FIG. 2B are provided solely for purposes of illustration, and that other materials may alternatively be used.

FIGS. 3A and 3B illustrate an alternative non-limiting embodiment of a portion of an imager having two different types of imaging pixels exhibiting different optical fill factors. As with the portion 200 in FIG. 2A, the different optical fill factors of the imaging pixel types of FIG. 3A may result in the imaging pixel types exhibiting different degrees of light sensitivity, different light saturation levels, or both different light sensitivities and different light saturation levels.

As shown, the portion 300 of an imager differs from the portion 200 in FIG. 2A in that, rather than some of the imaging pixels having a microlens and others not having a microlens, all of the imaging pixels in FIG. 3A have a microlens. However, the imaging pixels 302a have larger microlenses 306a than the microlenses 306b of imaging pixels 302b. The larger microlenses 306a may collect and focus a greater amount of incident radiation onto a respective underlying photodetector 204 than the smaller microlenses 306b, for a same amount of radiation uniformly incident on the imaging pixels. Accordingly, the imaging pixels 302a may have a greater optical fill factor and exhibit greater light sensitivity than the imaging pixels 302b, but also may exhibit a lower light saturation level than the imaging pixels 302b.

In some embodiments, the differences between the microlenses 306a and 306b may be designed to provide a desired difference in light sensitivity and/or light saturation level of the imaging pixels 302a and 302b. For example, the difference in size between microlenses 306a and 306b may be selected to provide a desired difference in light sensitivity of the imaging pixels, which, in some embodiments, may also result in the imaging pixel types having different light saturation levels. In one embodiment, the ratio of sizes (any one or more of diameter, width, or any other dimensions, which may depend on the shape of the microlenses) of the microlenses may be 2:1, less than 2:1, or any other ratio, as the embodiments described herein including microlenses of different sizes are not limited to any particular size differences.

FIG. 3B illustrates a cross section of the portion 300 taken along the line B-B' of FIG. 3A. As shown, the difference in size between microlenses 306a and 306b may relate to any dimension of the microlenses, including diameter D (i.e., a difference between $D_1$ and $D_2$ in those embodiments in which the microlenses have a substantially circular footprint) and/or height (i.e., a difference between $H_1$ and $H_2$, examples of which heights may be approximately 4 microns and approximately 3 microns, or any other suitable values). In one non-limiting embodiment, the ratio of $D_1$ to $D_2$ may be approximately 2:1, may be less than 2:1, or may be any other suitable ratio, as the embodiments described herein relating to imaging arrays comprising microlenses of different sizes are not limited to any particular size differences.

In addition to differences in size, the microlenses 306a and 306b may have different shapes and/or different materials (which may result in a different index of refraction) to provide a desired difference in optical fill factor and therefore light sensitivity and/or light saturation level of the imaging pixels. Thus, it should be appreciated that any parameter of a microlens that may impact the amount of incident radiation collected and focused by the microlens may serve as the basis for creating two different types of microlenses for different imaging pixel types, according to various embodiments of the invention. Thus, according to one embodiment, an imager comprises imaging pixels of different types that have different types of microlenses differing in any one or more of size, shape, material, and positioning relative to a photodetector.

Such differences may result in the different types of imaging pixels exhibiting different light sensitivities, different light saturation levels, or both.

As with the embodiment of FIG. 2A, the imaging pixels 302a and 302b of FIG. 3A may have substantially the same shape and area ($L_1 \times L_2$) as each other. In some embodiments, the area of the imaging pixels may be approximately the same (e.g., within approximately 5% of each other). In some embodiments, the dimension $L_1$ (e.g., the width of the imaging pixel) of each of the pixel types may be approximately the same (e.g., within approximately 5% of each other) and/or the dimension $L_2$ (e.g., the height of the imaging pixel) of each of the pixel types may be approximately the same (e.g., within approximately 5% of each other). In this manner, the layout of the array of imaging pixels 302a and 302b is simpler than if the imaging pixels 302a and 302b had different areas. However, not all aspects of the invention described herein relating to imaging arrays having different imaging pixel types are limited to the different imaging pixel types having the same shape and/or area, as the different imaging pixel types can alternatively have different shapes and/or areas.

According to one embodiment, an imager comprises an imaging array including imaging pixels of at least two types, in which at least one of the types includes microlenses of sufficiently large size such that not all of the imaging pixels of the imager can have microlenses of the same or larger size. In some such embodiments, the microlenses of one of the imaging pixel types may be sufficiently large that they may not be repeated at the pixel pitch. In some embodiments, the microlenses may have a footprint having a larger area than the area of the imaging pixel type having the microlenses. In some embodiments, the microlenses may have a footprint that has at least one dimension (e.g., diameter) that is greater than at least one dimension (e.g., height or width) of the imaging pixel. In some embodiments, the microlenses of sufficiently large size may result in the imaging pixels having an optical fill factor greater than 1 (greater than 100% when expressed as a percentage). An example is now given with reference to FIG. 4.

As shown, the imaging array 400 of an imager comprises two imaging pixel types, 402a and 402b. The imaging pixels 402a include a microlens 406 disposed above a corresponding photodetector 204. In the non-limiting embodiment of FIG. 4, the microlenses 406 are of sufficiently large size that the imaging pixels 402b can not also have microlenses of the same or a larger size. Thus, the imaging pixels 402b may not have microlenses (as shown) or in some embodiments (not shown) may have smaller microlenses of their own that do not cover the entire area of the imaging pixels 402b.

In some embodiments in which an imaging pixel type includes microlenses that are sufficiently large so that not all imaging pixels of the imaging array may include microlenses of the same or larger size, the microlenses (e.g., microlenses 406 in one non-limiting embodiment) are of sufficiently large size that they may not be repeated at the pixel pitch. For purposes of this application, the pixel pitch is the distance from a point in one imaging pixel to a corresponding point of a neighboring imaging pixel (e.g., from the upper left corner of a photodetector in one imaging pixel to the upper left corner of a photodetector in a neighboring pixel), in those embodiments in which the different imaging pixel types have the same size. In those embodiments in which the different imaging pixel types have different sizes, the pixel pitch is the average pixel spacing of the imaging array (e.g., if an imaging array includes 5 micron imaging pixels alternating with 15 micron imaging pixels, the pixel pitch is 10 microns, or the average of 5 microns and 15 microns). As shown, the microlenses 406 are too large to be repeated at either the horizontal pixel pitch ($L_1$ in the non-limiting example of FIG. 4) or the vertical pixel pitch ($L_2$ in the non-limiting example of FIG. 4) of the imaging array 400.

In some embodiments in which an imaging pixel type includes microlenses that are sufficiently large so that not all imaging pixels of the imaging array may include microlenses of the same or larger size, the microlenses may have at least one dimension that is greater than at least one dimension of the imaging pixel including the microlens. FIG. 4 again illustrates an example. As shown, the microlenses 406 have a substantially circular footprint with a diameter $D_3$ that is larger than the lengths $L_1$ and $L_2$ of the sides of imaging pixels 402*a* and 402*b*. It should be appreciated that microlenses according to such embodiments may have footprints of shapes other than circles, and that in such embodiments at least one of the dimensions may be greater than at least one, and in some embodiments two, dimensions of the imaging pixel.

In some such embodiments in which at least one dimension of a microlens is greater than at least one dimension of the imaging pixel including the microlens, the size difference may take any suitable value, and may result in the microlens at least partially overlaying one or more neighboring imaging pixels. As one non-limiting example, the value of $D_3$ may be 14 microns, and the values of $L_1$ and $L_2$ may each be 10 microns, such that the microlenses 406 may extend over neighboring imaging pixels 402*b* by approximately 2 microns. This, however, is only one non-limiting example. The overlay in any given direction may be 1 micron, 2 microns, between approximately 0.5 microns and 5 microns, or any other suitable values, as the embodiments including microlenses overlaying neighboring imaging pixels are not limited to any particular amount of overlay.

Figure 4:
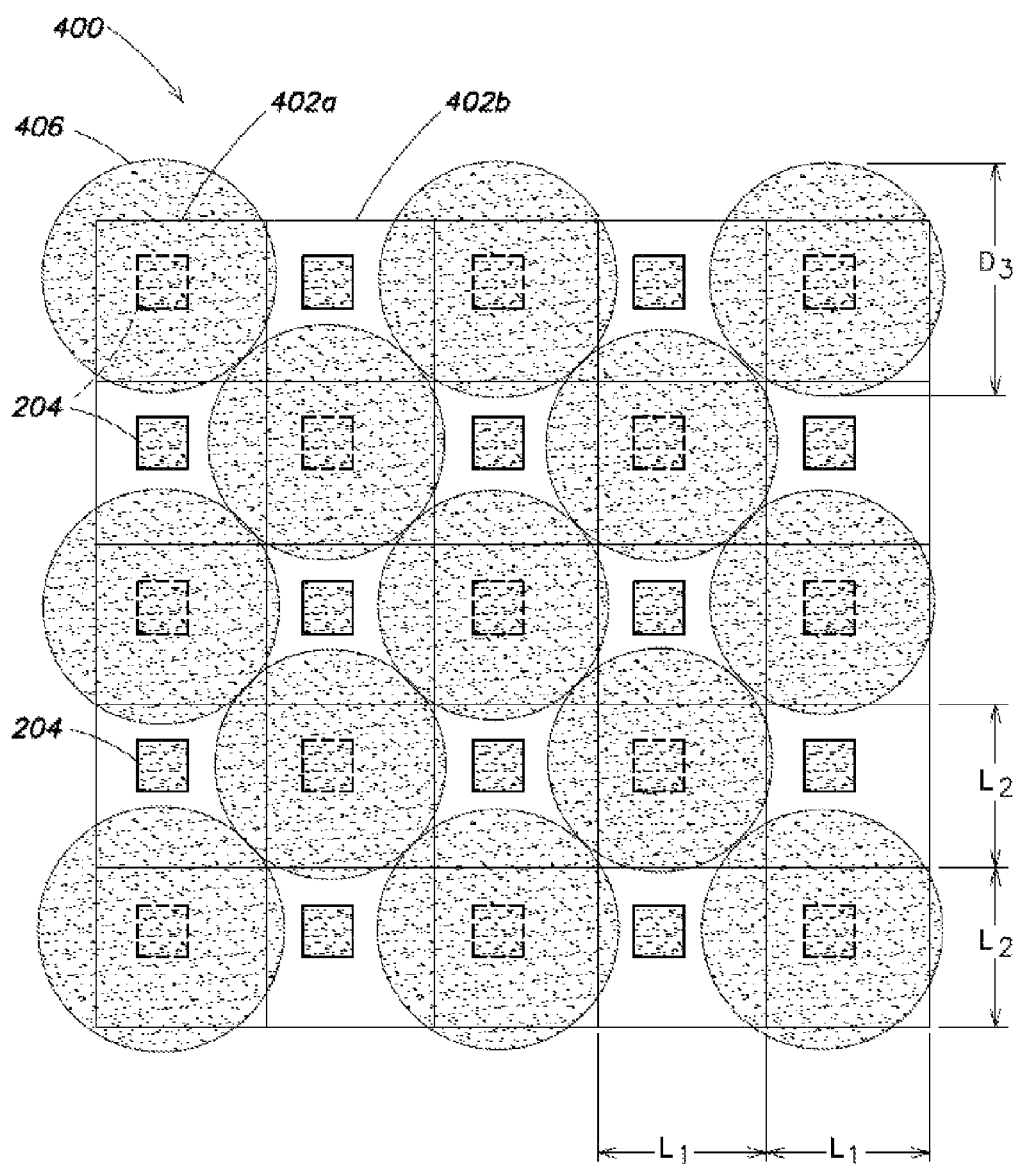
FIG. 4 is a plan view of an imaging array of an imager having different types of imaging pixels, in which one type of imaging pixel includes microlenses of sufficiently large size that they may not be repeated on all of the imaging pixels, according to one non-limiting embodiment.

In some embodiments in which an imaging pixel type includes microlenses that are sufficiently large so that not all imaging pixels of the imaging array may include microlenses of the same or larger size, the microlenses may have a footprint with an area larger than the area of the imaging pixel including the microlens. For example, referring again to FIG. 4, the area of the footprint of microlenses 406 (i.e., $\pi(D_3/2)^2$) may be larger than the area of imaging pixels 402*a* (i.e., $L_1 \times L_2$ in the non-limiting example). The footprint of the microlenses may have any suitable shape, and the circular footprints illustrated in FIG. 4 are non-limiting examples. Also, the difference in areas between the microlens footprint and the imaging pixel may have any suitable values. For example, the imaging pixel area may be equal to between approximately 95-99% of the area of the microlens footprint, between approximately 85-95% of the area of the microlens footprint, between approximately 75-85% of the area of the microlens footprint, or have any other suitable size.

By allowing the microlenses 406 to at least partially overlay neighboring imaging pixels, the microlenses 406 may be made larger than if their dimensions were constrained by the size of the imaging pixels 402*a*. Accordingly, the size of the microlenses may be chosen to increase the amount of incident radiation collected and focused by microlenses 406, which may result in a greater difference between the light sensitivity and/or light saturation level of imaging pixels 402*a* and imaging pixels 402*b* than would be possible if the microlenses were constrained to the size of the imaging pixels 402*a*. Accordingly, in some embodiments, the size of microlenses 406 may be selected to provide a desired difference between the light sensitivity and/or light saturation level of imaging pixels 402*a* and imaging pixels 402*b*, and may take any suitable value.

According to some embodiments in which an imaging pixel type of an imaging array includes microlenses that are sufficiently large so that not all imaging pixels of the imaging array may include microlenses of the same or larger size, the microlenses may result in the imaging pixels including the microlenses having an optical fill factor greater than 1 (greater than 100% when expressed as a percentage). Referring to FIG. 4, the microlenses may be sufficiently large such that the amount of radiation incident on them is greater than the amount of radiation incident within the area of the imaging pixels 402*a*. Thus, the microlenses 406 may collect and focus a greater amount of light onto an underlying photodetector 204 than is incident within the area of the imaging pixels 402*a* (i.e., $L_1 \times L_2$ in the non-limiting example of FIG. 4). Accordingly, the optical fill factor of imaging pixels 402 may be greater than 1. In some embodiments, the optical fill factor may be approximately 1.1, 1.2, 1.3, between approximately 1.1 and 1.5, between approximately 1.3 and 1.6, or any other suitable value. The size of the microlenses 406 may be chosen to provide a desired optical fill factor.

A non-limiting example of the increase in dynamic range that may be achieved using an imaging array of the type illustrated in FIG. 4 is now given. According to this example, the imaging pixels 402*a* (ignoring the microlenses 406 for the moment) and 402*b* may have an optical fill factor of 20%. However, The microlenses 406 may be sized such that the imaging pixels 402*a* have an effective optical fill factor of 120%. Thus, the ratio of light sensitivity of imaging pixels 402*a* to 402*b* is 6:1 in this non-limiting example. The imaging array 400 may therefore exhibit a dynamic range that is approximately 15 dB greater than would be achieved by forming an imager using only one of the two types of imaging pixels illustrated in FIG. 4. In one embodiment, the dynamic range of the imager may therefore be increased from approximately 60 dB in the scenario in which only one of the imaging pixel types of FIG. 4 is used to approximately 75 dB using the configuration of FIG. 4 with both imaging pixel types. It should be appreciated that different values (including higher values) for the increase in dynamic range and the total dynamic range may be achieved by suitable design of the microlenses, photodetectors, and imaging pixel areas, and that this non-limiting example is provided solely for purposes of illustration.

Although, for purposes of simplicity, FIG. 4 does not illustrate the multiplexing circuitry and processor of FIG. 2A, it should be appreciated that such additional components may be coupled to the imaging array illustrated in FIG. 4 and may function in the same manner as that described with respect to FIG. 2A. However, any other suitable circuitry for reading out and processing the output signals of the imaging pixels 402*a* and 402*b* may alternatively be used.

While FIGS. 2A-4 illustrate non-limiting examples of imaging arrays including imaging pixels having different optical fill factors and different light sensitivities and/or light saturation levels due, at least partially, to the use of microlenses, other structures may alternatively or additionally be used to create different imaging pixel types exhibiting different optical fill factors and different light sensitivities and/or light saturation levels while having photodetectors that are substantially the same. For example, attenuation filters may be used to alter the optical fill factors of an imaging pixel, as may a light blocking layer. FIGS. 5A-5B and 6A-6B illustrate non-limiting examples.

FIGS. 5A and 5B illustrate a plan view and a cross-section, respectively, of a portion of an imaging array 500 including different imaging pixel types having different attenuation filter structures. The imaging array 500 is substantially the same as that shown in FIG. 2A, except that, unlike imaging pixel types 202a and 202b of FIG. 2A, imaging pixel types 502a and 502b do not differ based on microlens structures. Rather, imaging pixels 502a include an attenuation filter 506, while imaging pixels 502b do not. The attenuation filters 506 may attenuate incident radiation such that the optical fill factor and the light sensitivity of imaging pixels 502a is less than that of imaging pixels 502b, while the light saturation level of imaging pixels 502a may be greater than that of imaging pixels 502b. The attenuation filters 506 may have any suitable size, shape, and material (e.g., a polymer or any other suitable material) to provide a desired level of attenuation, and therefore a desired optical fill factor for imaging pixels 502a. FIG. 5B illustrates a cross-section of the imaging array 500 taken along the line C-C' of FIG. 5A.

It should be appreciated that while pixels 502b in FIG. 5A are illustrated as lacking attenuation filters, not all embodiments are limited in this respect. For example, both imaging pixels types 502a and 502b may include attenuation filters, with the filters of the different imaging pixel types providing different levels of attenuation, such that the imaging pixel types may exhibit different light sensitivities and/or light saturation levels. Other configurations are also possible.

Figure 6B:
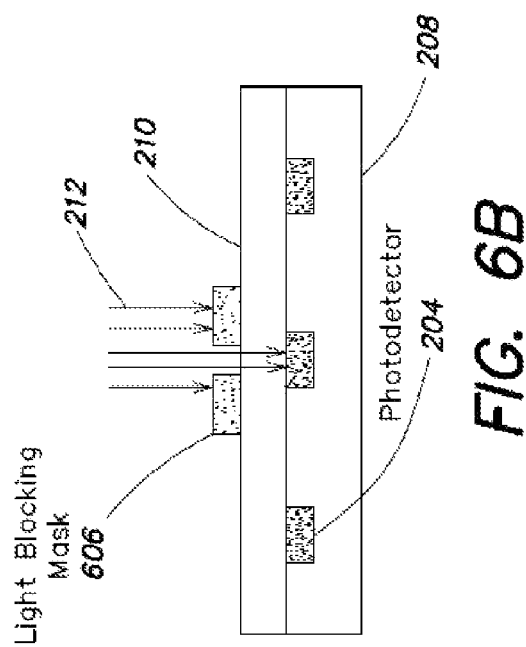
FIGS. 6A and 6B are a plan view and a cross-section, respectively, of a portion of an alternative imager having different types of imaging pixels with different optical fill factors, according to one non-limiting embodiment.
Figure 6A:
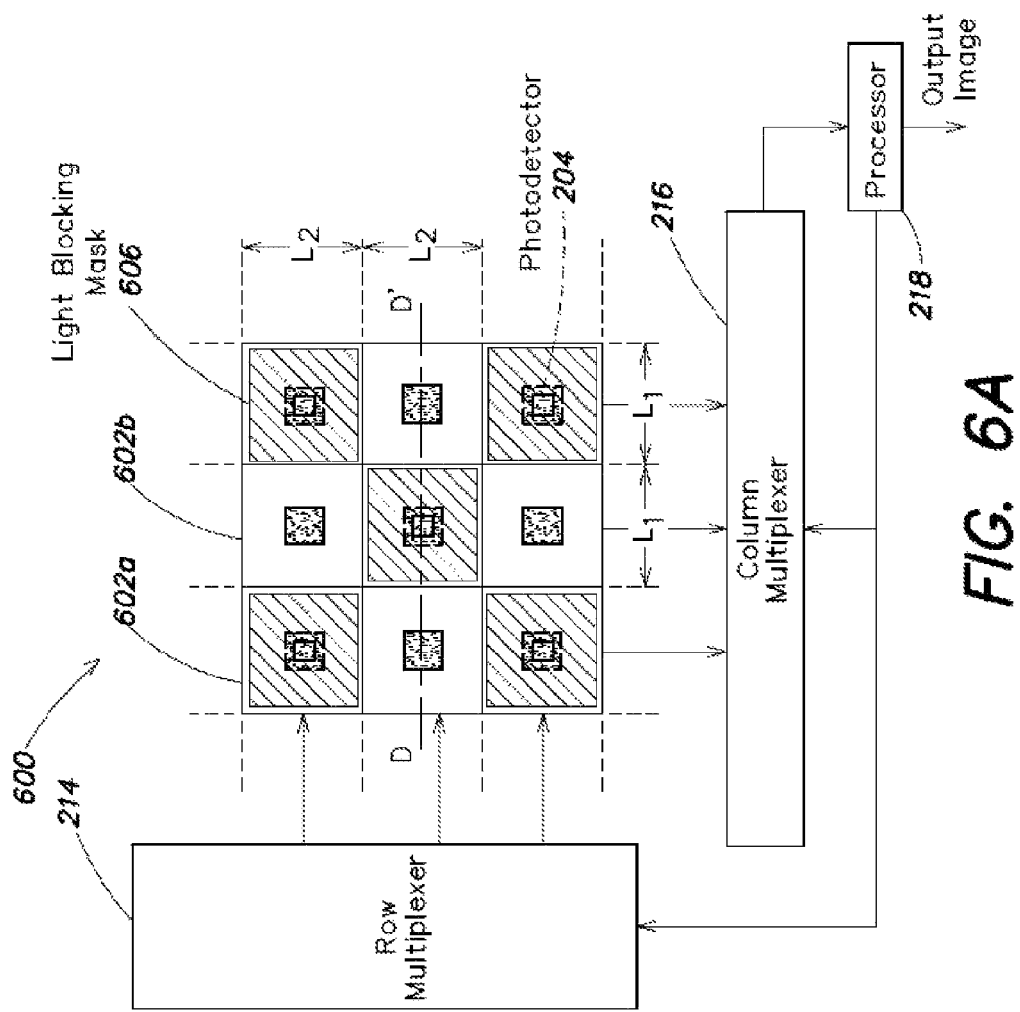

FIGS. 6A-6B illustrate a plan view and a cross-section, respectively, of an alternative imaging array including different imaging pixel types exhibiting different optical fill factors and different light sensitivities and/or light saturation levels, despite the imaging pixels have photodetectors that are substantially the same. The imaging array 600 is substantially the same as that shown in FIG. 2A, except that the imaging pixels 602a and 602b do not differ due to differences in microlenses. Rather, as shown, the imaging pixels 602a include a light blocking mask while imaging pixels 602 do not. The light blocking mask may be formed to cover at least a portion of the photodetectors 204 of imaging pixels 602a, as shown, such that the amount of incident radiation reaching photodetectors 204 of imaging pixels 602a is less than that reaching photodetectors 204 of imaging pixels 602b, even though the photodetectors 204 of both imaging pixel types are substantially the same in this non-limiting embodiment. Accordingly, the optical fill factor of imaging pixels 602a may be less than that of imaging pixels 602b, for example in those embodiments in which the area of imaging pixels 602a is approximately the same as that of imaging pixels 602b. As a result, the imaging pixels 602b may be more light sensitive than imaging pixels 602a, while at the same time having a lower light saturation level than the imaging pixels 602a.

The light blocking masks 606 may be formed of any suitable material for blocking at least a portion of incident radiation. For example, the light blocking masks 606 may be formed of metal, although other materials may additionally or alternatively be used.

FIG. 6B is a cross-section of the imaging array 600 taken along the line D-D' of FIG. 6A, and illustrates that the light blocking mask 606 may be configured to block at least some of incident radiation 212 from reaching an underlying photodetector 204. The embodiments of the invention relating to imaging pixels having a light blocking mask to reduce an optical fill factor of the imaging pixel are not limited to any particular configuration of the light blocking mask. Also, while imaging pixels 602b are illustrated as not including light blocking masks, it should be appreciated that in some embodiments they may include light blocking masks differing from those of imaging pixels 602a to create different optical fill factors of the different imaging pixel types.

As has been shown with respect to FIGS. 2A-6B, some embodiments of the present invention are directed to an imager comprising imaging pixels of at least two different types, and the different types of imaging pixels may be arranged into different sub-arrays having different light sensitivities and/or light saturation levels. For example, with respect to FIG. 2A, a first sub-array of imaging pixels comprises the imaging pixels 202a while a second sub-array comprises imaging pixels 202b. One or more images may be produced by suitably processing the output signals of the different sub-arrays in any suitable manner. According to one embodiment, a separate image is produced corresponding to each of the sub-arrays. These images can be accessed, stored, and used separately for any purpose. Alternatively, in one embodiment, the images from the sub-arrays are combined in any suitable manner to form a single image. An example is now given with respect to FIGS. 7A and 7B, although it should be appreciated that various alternatives for processing the output signals of different types of imaging pixels to produce an image are possible, and that the following example is given solely for purposes of illustration.

Figure 7A:
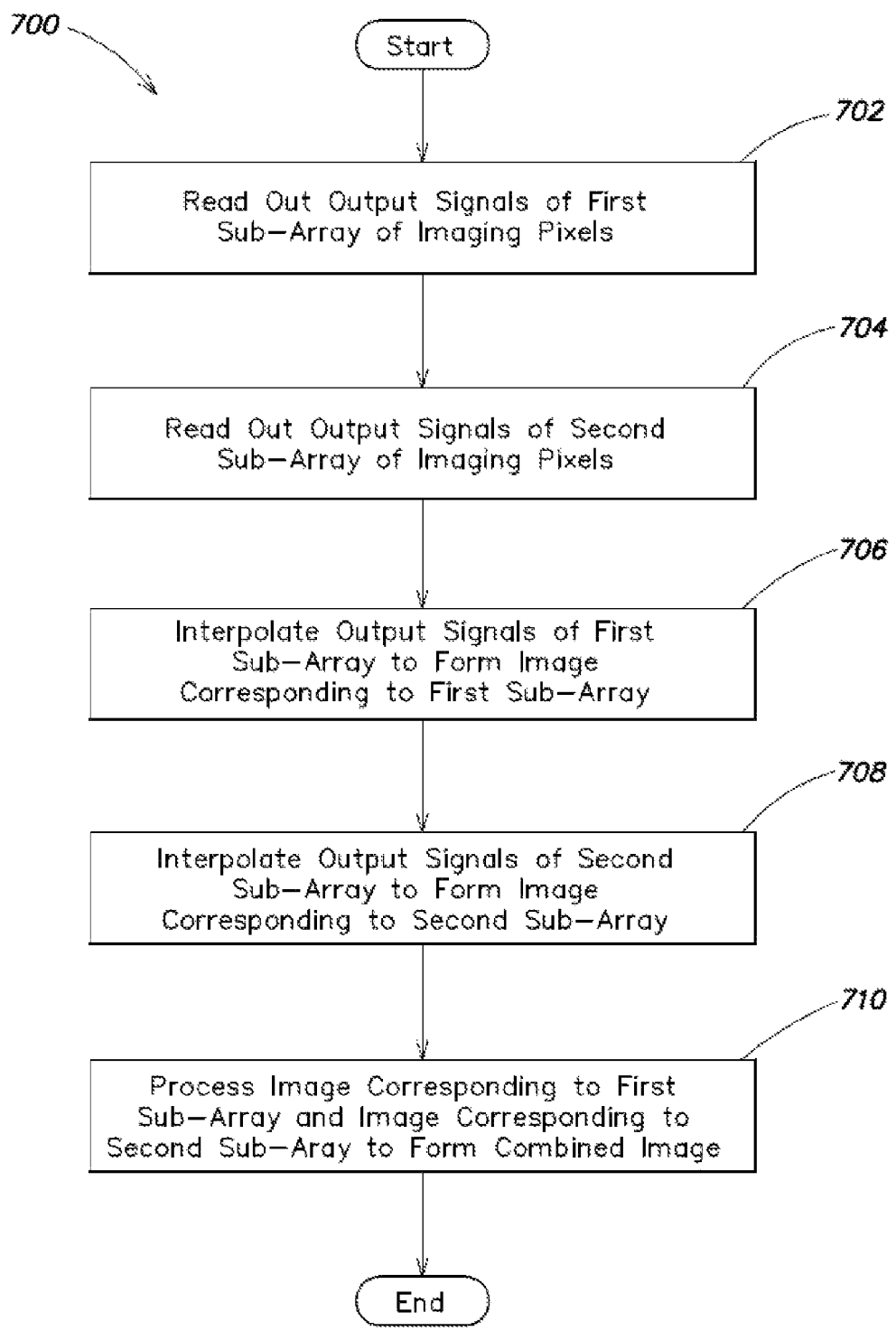
FIGS. 7A and 7B illustrate a method of producing an image by processing output signals from an imaging array comprising different imaging pixel types, according to one non-limiting embodiment.

FIG. 7A is a flowchart of a method for processing output signals of different sub-arrays of imaging pixels of an imager, according to one non-limiting embodiment. The method assumes two sub-arrays of imaging pixels, although it may apply equally well to three or more sub-arrays. It should be appreciated that the steps illustrated may be performed in any suitable order, including in some instances performing two or more steps concurrently, as the particular order illustrated is provided solely for purposes of illustration and is not limiting. The method will be described with respect to the imaging array of FIG. 2A, although it should be appreciated that the method may apply to any of the imaging arrays described herein (including those described above and further below). Also, reference to FIG. 7B will be made for purposes of illustration.

The method 700 comprises reading the output signals of the two sub-arrays of imaging pixels, which may be performed in any suitable manner. As illustrated in FIG. 7A, the output signals may be read out of the first sub-array of imaging pixels (e.g., imaging pixels 202a) at step 702, while the output signals may be read out of the second sub-array of imaging pixels (e.g., imaging pixels 202b) at step 704. While illustrated in FIG. 7A as being sequential, it should be appreciated that steps 702 and 704 may be performed concurrently in some embodiments or in any order. For example, referring to FIG. 2A, the output signals of the imaging array may be read out according to a raster scan scheme (i.e., scanning from left to right within a row of imaging pixels and then moving to the next row), although other schemes are also possible, and the method 700 is not limited in this respect.

Figure 7B:
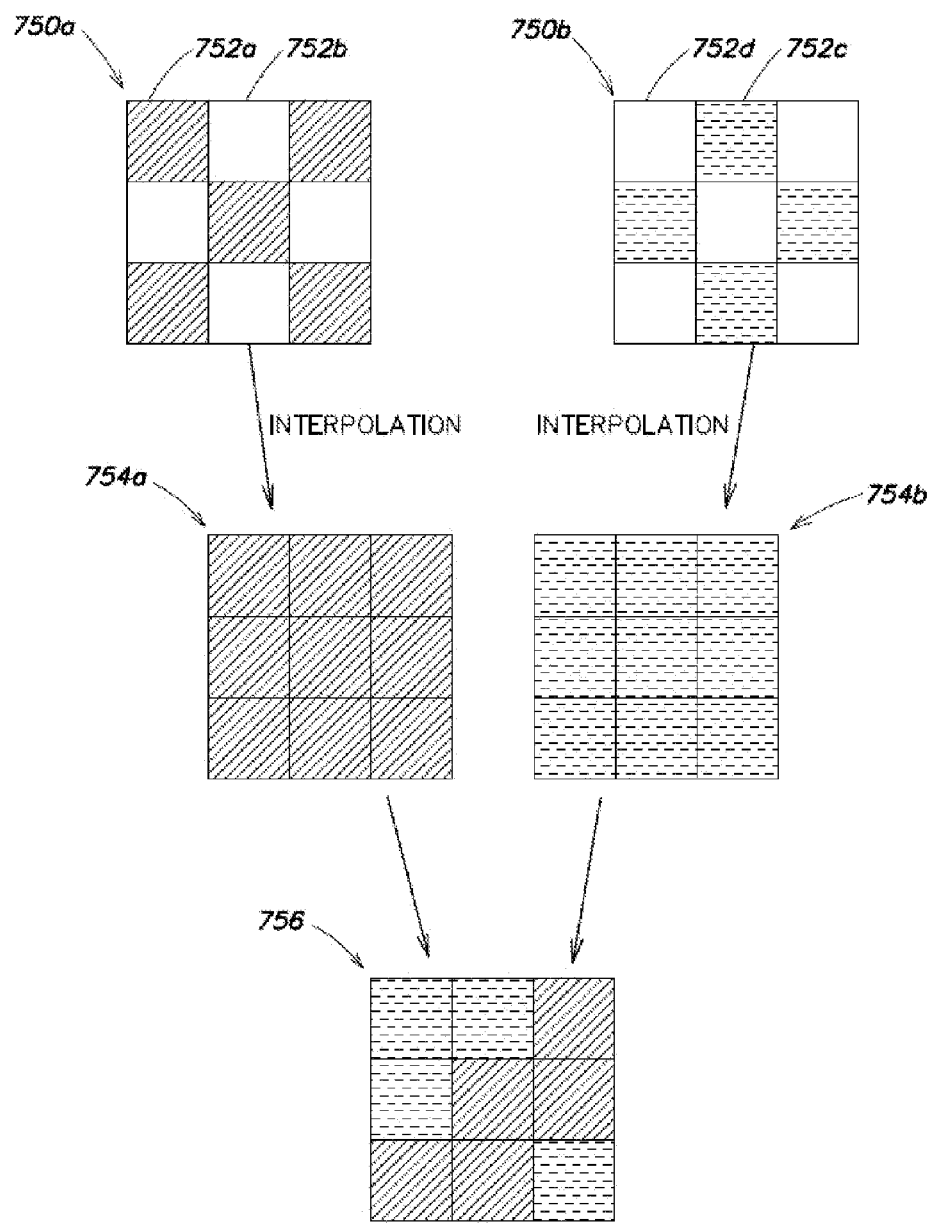

Steps 702 and 704 result in the data sets 750a and 750b illustrated in FIG. 7B. The data set 750a may correspond to the first sub-array of imaging pixels (e.g., a sub-array comprising imaging pixels 202a in FIG. 2A), and accordingly has data values 752a (indicated by the cross-hatching) at locations corresponding to the physical locations of the imaging pixels of the first sub-array (e.g., imaging pixels 202a), while having no data values (indicated by the blank squares 752b in FIG. 5B) corresponding to the locations of imaging pixels of the second sub-array (e.g., imaging pixels 202b of FIG. 2A). Similarly, the data set 750b may have data values 752c (indicated by the horizontal line pattern) at locations corresponding to the physical locations of imaging pixels of the second sub-array (e.g., imaging pixels 202b in FIG. 2A), while having no data values (illustrated by the blank squares 752d in FIG. 5B) at the locations of imaging pixels of the first type (e.g., imaging pixels 202a in FIG. 2A).

The method 700 may proceed to form images corresponding to the two sub-arrays. Interpolation is one technique which may be used for this purpose. As shown, at step 706 the output signals of the first sub-array (and therefore the data set 750a) may be interpolated to form an image 754a that includes data values for locations of all the imaging pixels of the imager. Similarly, at step 708 the output signals of the second sub-array (and therefore the data set 750b) may be interpolated to form an image 754b that includes data values for locations of all the imaging pixels of the imager. One interpolation scheme which may be employed for steps 706 and 708 is so-called nearest neighbor interpolation, in which each imaging pixel having no data value is assigned a data value equal to the mean of its nearest imaging pixel neighbors. In one embodiment of a large imaging array, the majority of the imaging pixels will have four nearest neighbors, such that applying a nearest neighbor interpolation scheme may comprise taking the mean of the four nearest neighbors. However, nearest neighbor interpolation is not limited to any particular number of neighboring imaging pixels. Furthermore, any suitable interpolation scheme may be employed, as the method 700 is not limited in this respect.

The method 700 may proceed at step 710 to process the images produced by steps 706 and 708 to form a combined image 756 (shown in FIG. 7B). Any suitable processing may be performed, as the various aspects described herein are not limited in this respect. According to one embodiment, step 710 may comprise, for each imaging pixel location, analyzing the two data values from steps 706 and 708 (e.g., the data values from images 754a and 754b) for the imaging pixel location to determine if each of the two data values is valid (e.g., below a light saturation level). If the value from step 706 (the interpolated image from the imaging array having greater light sensitivity, in this non-limiting embodiment) is valid, it may be used in the combined image. If the value from step 706 is not valid, the value from step 708 (the interpolated image from the sub-array having lower light sensitivity, in this non-limiting embodiment) may be used in the combined image. If the value from step 708 is used, it may be scaled by the ratio of the sensitivity of the two imaging sub-arrays so that each sub-array generates an equivalent combined image signal level for a given level of incident radiation. It should be appreciated, however, that any form of processing may be performed at step 710 to produce the combined image, and that the above-described example is provided solely for purposes of illustration, and does not limit the aspects of the invention relating to processing output signals from any of the types of imaging arrays described herein.

According to some embodiments, the method 700 produces images that accurately represent a high degree of contrast in an imaged scene. For example, as has been previously described with respect to FIGS. 2A-6B, one or more of the imaging arrays described herein may comprise imaging pixels that exhibit different degrees of light sensitivity and/or different saturation levels. Thus, sub-arrays of imaging pixels formed of the different imaging pixel types may differ in their ability to capture bright and dark areas within a scene. As a non-limiting example, the sub-array of imaging pixels 202a in FIG. 2A may comprise imaging pixels with greater light sensitivity (i.e., that are more light sensitive) than the imaging pixels 202b. As a result, the imaging pixels 202a may more accurately image dark areas within a scene than the imaging pixels 202b. However, the imaging pixels 202a, in some embodiments, may have a lower saturation level than the imaging pixels 202b, such that the sub-array of imaging pixels 202b may more accurately image bright areas within a scene. By suitably combining the output signals of the sub-arrays (e.g., using method 700 or any other suitable method), a combined image may be produced that more accurately portrays both bright and dark areas within a scene than if either sub-array was used alone.

It should be appreciated that the methods described herein for processing output signals of sub-arrays of an imaging array are not limited to forming images that are displayed, but rather may alternatively form data sets that are used for any purpose. For example, referring to the method 700, it should be appreciated that the examples of steps 706, 708, and 710 as resulting in images is non-limiting. Each of the steps of method 700 may be used to produce data and data sets in any form that may be used for any purpose, and that are not necessarily used to produce a displayed image. Thus, according to some embodiments, the images 754a, 754b, and 756 in FIG. 7B may alternatively be data sets that are not displayed. Generally, the methods described herein may be used to produce data in any form used for any purpose, as producing images is only one non-limiting example.

Imaging Sub-Arrays with Different Photocharge Storage Capacitances

According to another aspect of the invention, an imager includes an imaging array with two or more sub-arrays of imaging pixels of different types, with the different types of imaging pixels differing in their photocharge storage capacitances. In one embodiment, the difference in photocharge storage capacitances of the different imaging pixel types results from the different imaging pixel types having different numbers of capacitors configured to store photocharge generated by a photodetector of the imaging pixel. In an alternative embodiment, the difference results from the different imaging pixel types having different capacitors with different capacitances (e.g., one or more of the photocharge storage capacitors of one imaging pixel type may be physically larger than the photocharge storage capacitors of a different imaging pixel type). The different photocharge storage capacitances of the different imaging pixel types may result in the different imaging pixel types having different light sensitivities and/or light saturation levels, which may facilitate imaging both bright and dark areas within a scene using the imager.

Figure 8:
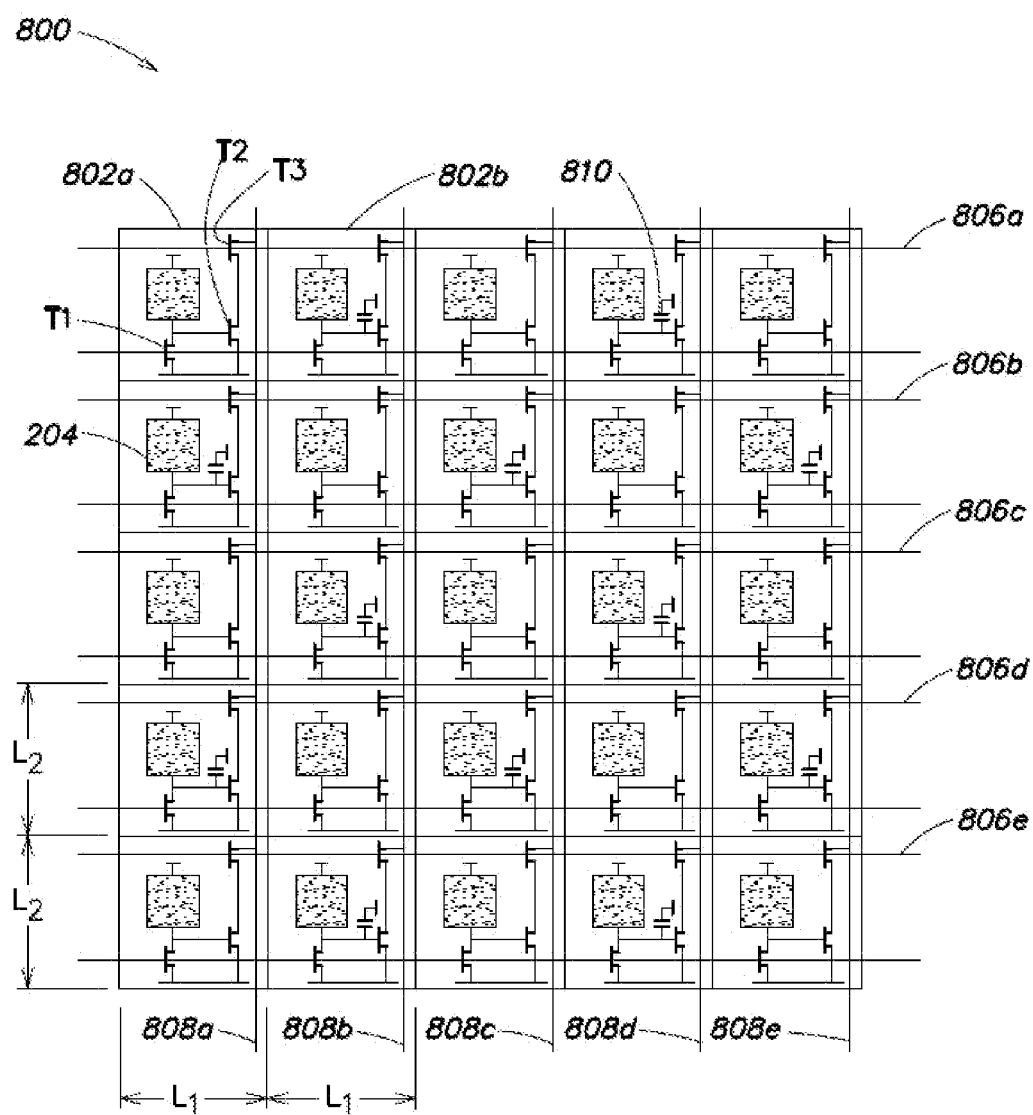
FIG. 8 is a circuit schematic of an imaging array having different types of imaging pixels with different photocharge storage capacitances, according to one non-limiting embodiment.

FIG. 8 illustrates a non-limiting example of an imaging array 800 comprising two types of imaging pixels 802a and 802b that differ in their photocharge storage capacitances. The illustrated imaging pixels are 3T imaging pixels, because they have three transistors. However, it should be appreciated that the aspects described herein relating to imaging arrays having two or more imaging pixel types that differ in their photocharge storage capacitances may also apply to other imaging pixel configurations (e.g., 4T, 5T, or 6T imaging pixels, as non-limiting examples), and that the illustrated 3T design is provided solely for purposes of illustration.

Each of the imaging pixel types 802a and 802b includes a same photodetector 204, which may generate a photocurrent in response to receiving incident radiation. The photocurrent may be accumulated as photocharge on a charge storage node of the imaging pixel, which, in the non-limiting example of FIG. 8, corresponds to the gate terminal of source follower transistor T2 in each imaging pixel. The amount of photocharge stored on the charge storage node may also be altered by operation of precharge transistor T1, which may be configured to provide an initial charge to the charge storage node at the beginning of an integration cycle of the imaging pixel. To read out the charge stored on the charge storage node (i.e., the gate terminal of source follower transistor T2 in the non-limiting example of FIG. 8), a row select transistor T3 is activated by applying a suitable signal to a respective row select bus (806a-806e) coupled to the row select transistor.

Applying such a signal connects the source follower transistor T2 to a respective column bus (808a-808e) to provide an output signal on the column bus representing the charge stored on the charge storage node.

The imaging pixels 802b differ from the imaging pixels 802a in that they include an additional capacitor 810 coupled to the charge storage node of the imaging pixel (e.g., coupled between the charge storage node and a reference node, which may be ground in some non-limiting embodiments). The capacitors 810 may be "additional" in that they provide a capacitance in addition to any capacitance otherwise associated with the charge storage node. In some embodiments, the capacitors 810 may be discrete capacitors, although not all embodiments are limited in this respect, as the imaging pixels may be formed so that the intrinsic capacitances of other elements of the imaging pixels differ between the imaging pixel types.

The inclusion of capacitors 810 may result in the imaging pixels 802b exhibiting a different light sensitivity and/or light saturation level than the imaging pixels 802a. In some embodiments, the imaging pixels 802b may exhibit a lower light sensitivity (i.e., may be less light sensitive) than imaging pixels 802a, in that a greater optical signal is needed to produce a valid output signal from imaging pixels 802b than from imaging pixels 802a. The imaging pixels 802b may have a higher light saturation level than the imaging pixels 802a, for example resulting from the increased photocharge storage capacitance provided by capacitors 810. Accordingly, in some embodiments the imaging pixels 802a may more accurately portray dark areas within an imaged scene, whereas the output signals of imaging pixels 802b may more accurately portray bright areas within the imaged scene. It should be appreciated that the imaging array 800 may be operated to produce an image (or data set) using the method 700 or any other suitable method. Thus, according to some embodiments, an imaging array such as imaging array 800 may be used to more accurately image a scene having both bright and dark areas than can conventional imagers.

The capacitors 810 may have any suitable values (e.g., 10 femtoFarads (fF), 20 fF, 50 fF, or any other suitable values), as the various aspects described herein relating to imaging pixels having an additional capacitance coupled to a charge storage node to store photocharge are not limited in this respect. The values of the capacitors 810 may be chosen to provide a desired light sensitivity and/or light saturation level of the imaging pixels 802b, in some non-limiting embodiments.

A non-limiting example of the increase in dynamic range that may be achieved using an imaging array of the type illustrated in FIG. 8 is now given. In this non-limiting example, the imaging pixels 802a may have a capacitance of 10 femtoFarads (fF) on the charge storage node of the imaging pixel, for example corresponding to an inherent capacitance of the source follower transistor T2. The capacitors 810 may be 50 fF capacitors, such that the imaging pixels 802b have a capacitance of 60 fF on the charge storage node. Accordingly, the ratio of light sensitivity of imaging pixels 802a to 802b is 6:1 in this non-limiting example, and thus an increase in dynamic range of approximately 15 dB may be realized by the imaging array of FIG. 8 compared to an imager having imaging pixels of only one of the two types illustrated in FIG. 8. In one embodiment, the dynamic range of the imager may therefore be increased from approximately 60 dB in the scenario in which only one of the imaging pixel types of FIG. 8 is used to approximately 75 dB using the configuration of FIG. 8 with both imaging pixel types. It should be appreciated, however, that the values of the increase in dynamic range and the total dynamic range given in this example are non-limiting, and that other values (including higher values) may result from suitable selection of the capacitance of capacitors 810.

It should be appreciated that the imaging pixels 802a and 802b may be arranged in any suitable sub-array configurations and that the checkerboard pattern illustrated is merely one non-limiting example. Furthermore, it should be appreciated that while, for simplicity, FIG. 8 does not illustrate the multiplexer circuitry or processor of FIG. 2A, the imaging array 800 may be coupled to such additional components or any other suitable circuitry for operating the imaging pixels and processing the output signals of the imaging pixels.

It should further be appreciated that the imaging array 800 may retain simplicity in pixel design despite the imaging pixels 802a and 802b having different structures. For example, the imaging pixels 802a and 802b may have substantially the same area ($L_1 \times L_2$) and/or shape. However, the aspects of the invention relating to imaging arrays having different types of imaging pixels differing in their photocharge storage capacitances are not limited to the different types of imaging pixels being of the same size and/or shape.

In those embodiments in which an imaging array comprises different types of imaging pixels that differ in the number of capacitors they have configured to store photocharge, the capacitors may be located at any suitable location within the imaging pixels. According to one non-limiting embodiment, one or more of the capacitors may be underneath the photodetector of the imaging pixel. An example is shown in FIG. 9, and reference is made to FIG. 8 for purposes of illustration.

Figure 9:
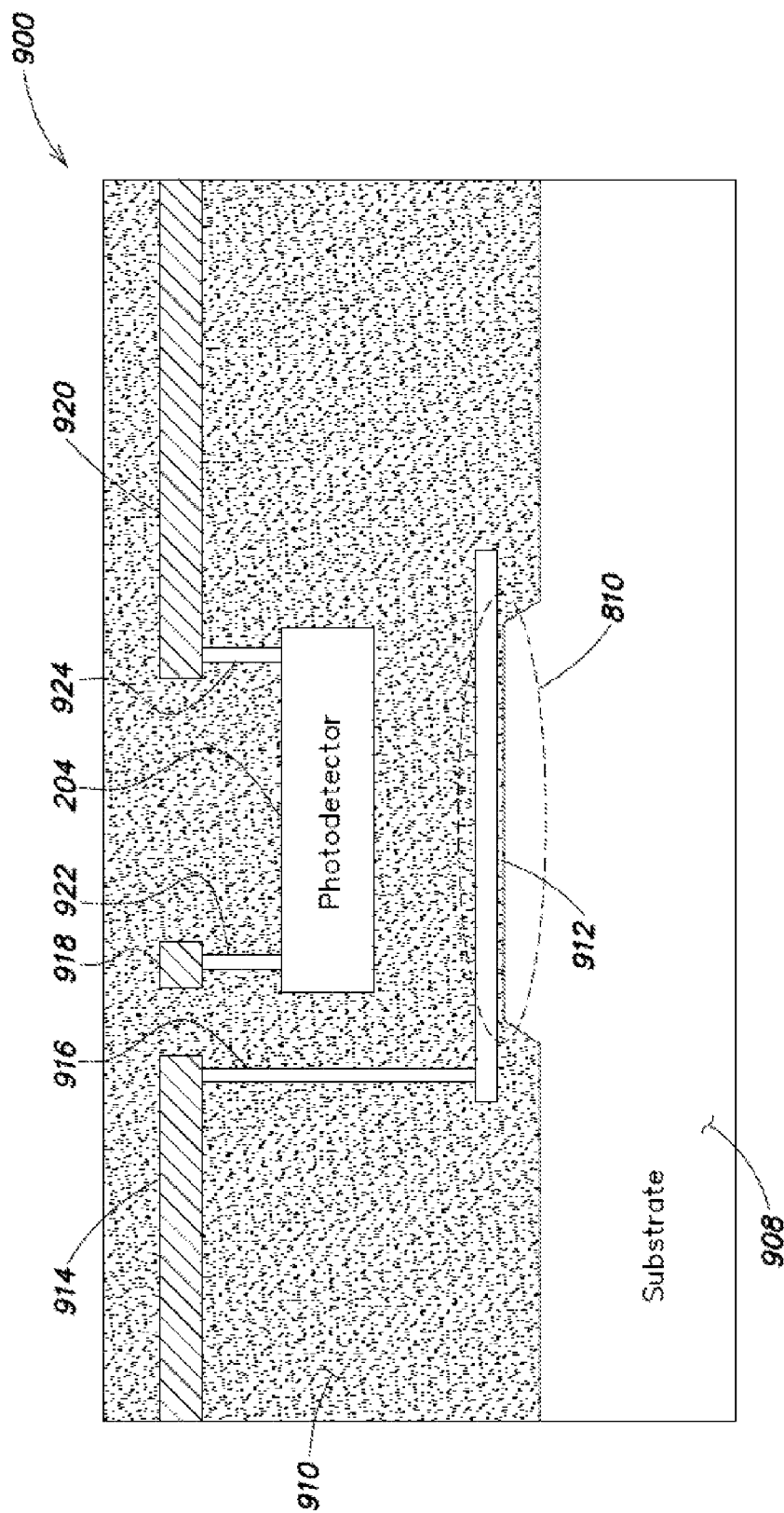
FIG. 9 is a cross-section of an imaging pixel of one of the types illustrated in FIG. 8, illustrating one possible arrangement of a capacitor and photodetector of the imaging pixel, according to one non-limiting embodiment.

FIG. 9 illustrates a cross section of one type of imaging pixel including a capacitor positioned substantially underneath a photodetector of the pixel and configured to collect photocharge. The imaging pixel 900 represents one possible implementation of imaging pixels 802b of FIG. 8, although other configurations are also possible. The imaging pixel 900 includes a photodetector 204 formed within a passivation layer 910 ($SiO_2$ or any other suitable passivation material) on a substrate 908 (a Silicon substrate, or any other suitable material). The capacitor 810 in this non-limiting embodiment is formed from a polysilicon layer 912 and the substrate 908, and is positioned substantially underneath the photodetetor 204. Contact to the capacitor is provided by metallization 914 and via 916, and in some embodiments the substrate 908 may be connected to a reference potential (e.g., ground). Contact to the photodetector 204 may be provided by metallization 918 and 920 and respective vias 922 and 924.

It should be appreciated that the positioning of capacitor 810 in FIG. 9 represents only one possible configuration, and that the capacitor 810 may be positioned in other locations with respect to the photodetector 204, as the various aspects of the invention including an additional capacitor configured to store photocharge are not limited to the capacitor being positioned in any particular location within the imaging pixel. Also, it should be appreciated that the imaging pixel 900 may additionally include a microlens, attenuation filter, or light blocking mask in some embodiments, as will be described in greater detail below, with respect to FIG. 10.

As described, FIG. 8 illustrates an embodiment of an imaging array having different types of imaging pixels with different numbers of capacitors configured to store photocharge. According to one alternative embodiment, an array of imaging pixels comprises two or more different imaging pixel types that differ in that they have different photocharge storage capacitances even though they may have the same number of photocharge storage capacitors. According to this embodiment, the different types of imaging pixels may have the same number of capacitors configured to store photocharge, but the capacitors may be of different sizes, such that one type of imaging pixel may be capable of storing a greater amount of photocharge than another type of imaging pixel. The difference in size between the capacitors of the different imaging pixel types may be chosen to provide a desired difference in light sensitivity and/or light saturation level of the different imaging pixel types.

Imaging Sub-Arrays with Different Optical Fill Factors and Different Photocharge Storage Capacitances According to one aspect of the invention, an imager includes an imaging array comprising two or more sub-arrays of imaging pixels of different types, wherein the imaging pixels of different types differ in both the optical fill factor exhibited and in their photocharge storage capacitances. For example, any of the concepts illustrated in FIGS. 2A-6B may be combined with any of the concepts illustrated in FIGS. 8-9, according to one non-limiting embodiment. An example is shown in FIG. 10.

As shown, the imaging array 1000 comprises two different types of imaging pixels, 1002a and 1002b, arranged into two sub-arrays according to a checkerboard pattern. The imaging pixels 1002a may include microlenses 406, and may substantially correspond in one non-limiting embodiment to imaging pixels 402a of FIG. 4. By contrast, the imaging pixels 1002b may not include microlenses 406, but rather may correspond substantially in one non-limiting embodiment to imaging pixels 802b of FIG. 8, having an additional capacitor 810 coupled to a charge storage node of the imaging pixel to store photocharge, which imaging pixels 1002a may not include. Thus, according to one embodiment, the imaging pixels 1002a may exhibit greater light sensitivity (i.e., be more light sensitive) than imaging pixels 1002b, but may also have a lower light saturation level than imaging pixels 1002b. The output signals of the imaging pixels of imaging array 1000 may be processed in any manner previously described herein, or in any other suitable manner, and thus in some embodiments may be processed to form an image accurately portraying both bright and dark areas within an imaged scene. Also, it should be appreciated that any combination of the imaging array features described with respect to FIGS. 2A-6B and FIGS. 8-9 may be used (e.g., any combination of microlenses, attenuation filters, light blocking masks, and/or capacitors), and that the example of FIG. 10 is provided solely for purposes of illustration and is not limiting.

Figure 10:
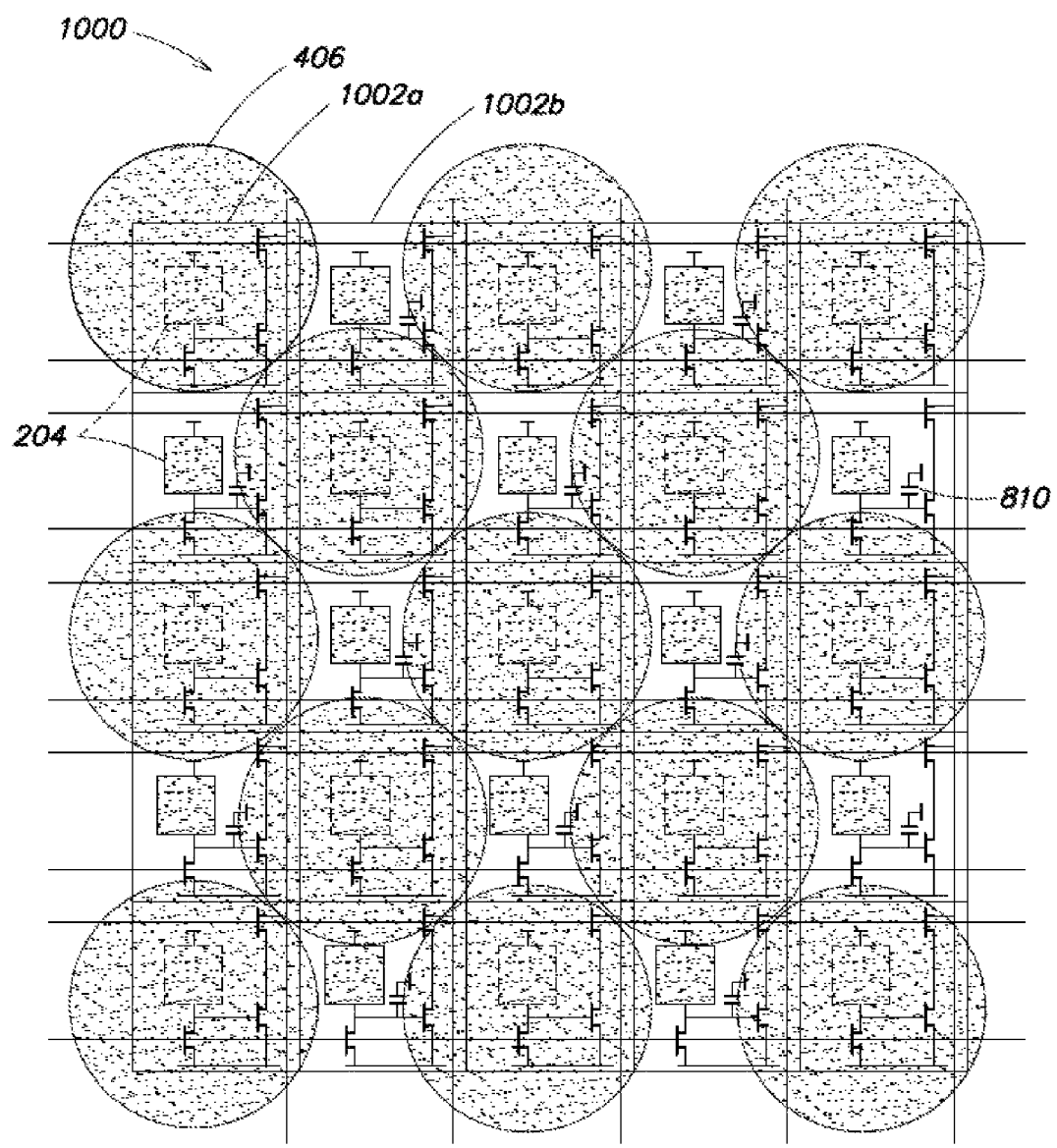
FIG. 10 is a plan view of an imaging array of an imager having different types of imaging pixels with different optical fill factors and with different photocharge storage capacitances, according to one non-limiting embodiment.

An imaging array of the type illustrated in FIG. 10 may provide an increase in dynamic range over imaging arrays having only one of the two types of imaging pixels illustrated in FIG. 10. A non-limiting example is now given. As should be appreciated from the example described above in connection with FIG. 4, the ratio of the light sensitivity of the imaging pixels 1002a to 1002b resulting from the microlenses 406 is 6:1 in one non-limiting example. Similarly, the ratio of the light sensitivity of imaging pixels 1002a to 1002b resulting from the capacitors 810 is 6:1 in one non-limiting example. Therefore, in one non-limiting example, the ratio of the light sensitivity of imaging pixels 1002a to 1002b is 36:1, representing an increase in dynamic range of approximately 30 dB compared to an imaging array having only one of the two types of imaging pixels 1002a and 1002b. In one embodiment, the imaging array may have a dynamic range of approximately 90 dB compared to a dynamic range of 60 dB when only one of the types of imaging pixels of FIG. 10 is used. However, it should be appreciated that the values for the increase in dynamic range and total dynamic range given in this example are non-limiting, and that other values (including higher values) may be achieved by suitable design of the imaging array according to aspects of the present invention.

Although, for purposes of simplicity, FIG. 10 does not illustrate the multiplexing circuitry and processor of FIG. 2A, it should be appreciated that such additional components may be coupled to the array of imaging pixels illustrated in FIG. 10 and may function in the same manner as that described with respect to FIG. 2A. However, any other suitable circuitry for reading out and processing the output signals of the imaging pixels 1002a and 1002b may alternatively be used.

It should be appreciated that the number of imaging pixels illustrated in the accompanying drawings is only an example, and that imagers according any of the aspects described herein may include hundreds, thousands, or millions of imaging pixels, and are not limited to any particular number of imaging pixels. For example, imaging arrays according to one or more of the aspects described herein may be 720×576 imaging pixel arrays or may have any other suitable number of imaging pixels.

Devices

Figure 11:
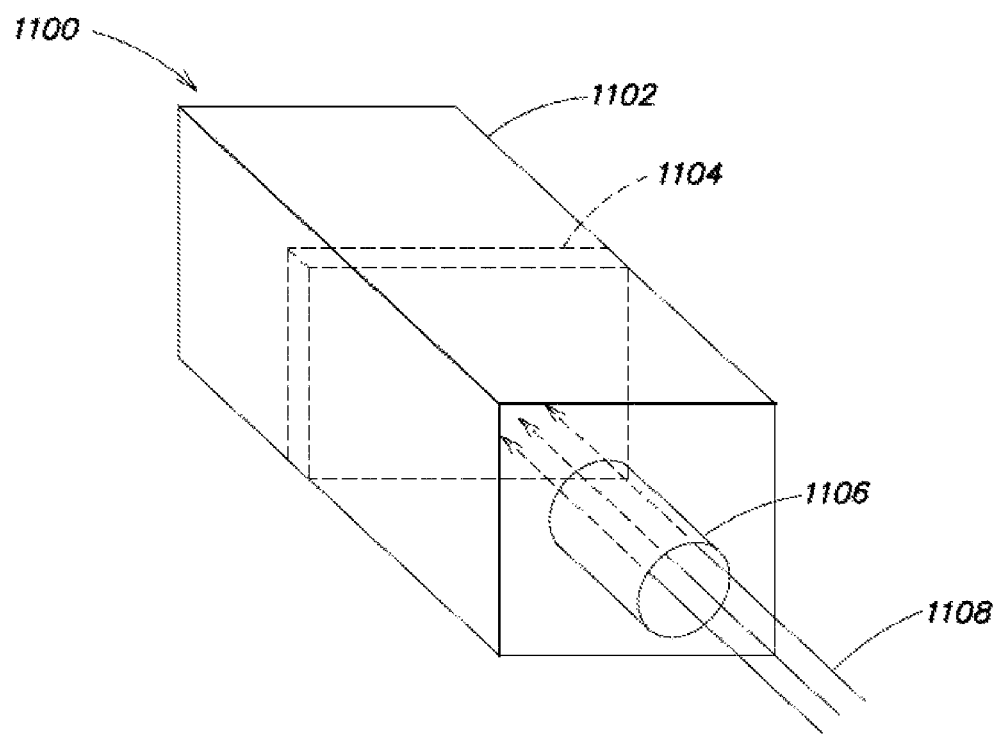
FIG. 11 illustrates a camera comprising an imaging array of any of the types described herein, according to one non-limiting embodiment.

The various aspects of the invention described herein may be used in various devices, and are not limited to use in any particular types of devices. According to one embodiment, imaging arrays according to any of the aspects described herein may be used to form at least part of a camera. For example, referring to FIG. 11, a camera 1100 may include a housing 1102, an imaging array 1104 disposed within the housing, and optics 1106. The imaging array may be any of the types of imaging arrays described herein or any other imaging array employing one or more of the various aspects described herein. The optics may include any suitable optics (e.g., collimation optics, one or more lenses, one or more filters, etc.) for collecting and focusing incident radiation 1108 on the imaging array 1104.

One or more of the various aspects described herein may apply to active pixel CMOS imagers. Some embodiments may also or alternatively apply to CCD imagers. For example, the aspects described herein relating to the use of microlenses, attenuation filters, or light blocking masks to produce imaging pixels exhibiting different optical fill factors may apply to both CMOS imagers and CCD imagers.

Having thus described several aspects of the invention, it is to be appreciated various alterations, modifications, and improvements will readily occur to those skilled in the art. Such alterations, modifications, and improvements are intended to be within the spirit and scope of the aspects of the invention. Accordingly, the foregoing description and drawings are by way of example only.

As one example, in those embodiments in which an imaging array includes imaging pixels having microlenses, the microlenses may have any suitable positioning with respect to the imaging pixels. For example, referring to FIG. 2A, the microlenses may be approximately centered within a pixel. Alternatively, as shown in FIGS. 4 and 10, the microlenses may be offset from the center of the imaging pixels. In some embodiments, the microlenses may be approximately centered over a photodetector of the imaging pixel, and therefore may be offset from the center of the imaging pixel if the photodetector is offset from the center of the imaging pixel. Accordingly, the various aspects of the invention described herein relating to imaging arrays including imaging pixels having microlenses are not limited to any particular positioning of the microlenses.

What is claimed is:

1. An array of imaging pixels, comprising:
   a plurality of imaging pixels comprising imaging pixels of at least two structurally different types, the at least two structurally different types comprising a first type and a second type;
   wherein the imaging pixels of the first type and the second type comprise photodetectors that are substantially a same material and shape as each other and are integrated on a same substrate;
   wherein the imaging pixels of the first type are configured to have a greater light sensitivity and lower light saturation level than the imaging pixels of the second type; and
   wherein the imaging pixels of the first type include respective microlenses configured to provide the imaging pixels of the first type with a greater optical fill factor than the imaging pixels of the second type.

2. The array of imaging pixels of claim 1, wherein the imaging pixels of the first type are of approximately a same size as the imaging pixels of the second type.

3. The array of imaging pixels of claim 1, wherein the imaging pixels of the second type do not include a microlens.

4. The array of imaging pixels of claim 1, wherein the imaging pixels of the first type include a first type of microlens providing a first optical fill factor and wherein the imaging pixels of the second type include a second type of microlens providing a second optical fill factor less than the first optical fill factor.

5. The array of imaging pixels of claim 1, wherein the microlenses of the first type of imaging pixels have a sufficiently large size that imaging pixels of the second type cannot have microlenses of the same or larger size.

6. The array of imaging pixels of claim 1, wherein the imaging pixels of the first type have an optical fill factor greater than one.

7. The array of imaging pixels of claim 1, wherein a first of the microlenses corresponding to a first imaging pixel of the first type has a footprint having an area greater than an area of the first imaging pixel of the first type.

8. The array of imaging pixels of claim 1, wherein a first of the microlenses corresponding to a first imaging pixel of the first type has a footprint having at least one dimension larger than at least one dimension of the first imaging pixel of the first type.

9. The array of imaging pixels of claim 1, wherein the photodetectors comprise germanium.

10. The array of imaging pixels of claim 9, wherein the photodetectors comprise substantially pure germanium.

11. The array of imaging pixels of claim 1, wherein the plurality of imaging pixels are active CMOS imaging pixels.

12. The array of imaging pixels of claim 1, wherein the imaging pixels of the second type include an attenuation filter configured to provide the imaging pixels of the second type with a lower optical fill factor than the imaging pixels of the first type.

13. The array of imaging pixels of claim 1, wherein the imaging pixels of the second type include a light blocking mask configured to provide the imaging pixels of the second type with a lower optical fill factor than the imaging pixels of the first type.

14. The array of imaging pixels of claim 1, wherein a first imaging pixel of the second type is configured to have a greater photocharge storage capacitance for storing photocharge generated by the photodetector of the first imaging pixel of the second type than is a first imaging pixel of the first type for storing photocharge generated by the photodetector of the first imaging pixel of the first type.

15. The array of imaging pixels of claim 14, wherein the imaging pixels of the second type have an additional capacitor configured to store photocharge compared to the imaging pixels of the first type.

16. The array of imaging pixels of claim 15, wherein each of the imaging pixels of the second type has a charge storage node formed by a gate terminal of a transistor, the charge storage node configured to store photocharge generated by the photodetector of the imaging pixel, and wherein the additional capacitor of each of the imaging pixels of the second type is coupled between the charge storage node of the imaging pixel and a reference node.

17. The array of imaging pixels of claim 15, wherein the imaging pixels of the second type comprise photodetectors disposed at a first height above a first surface of the substrate, and wherein the additional capacitor of each of the imaging pixels of the second type is disposed at a second height above the first surface of the substrate, the second height being less than the first height.

18. The array of imaging pixels of claim 17, wherein the additional capacitor of each of the imaging pixels of the second type is disposed between the substrate and the photodetector of the imaging pixel.

19. The array of imaging pixels of claim 14, wherein the imaging pixels of the first type are of approximately a same size as the imaging pixels of the second type.

20. The array of imaging pixels of claim 14, wherein each of the imaging pixels of the second type has a larger capacitor configured to store photocharge generated by the photodetector of the imaging pixel than a capacitor of the imaging pixels of the first type configured to store photocharge generated by the photodetector of the imaging pixel of the first type.

21. The array of imaging pixels of claim 1, wherein the array forms at least part of a camera.

22. A system for forming images, the system comprising the array of imaging pixels of claim 1 in combination with at least one processor, wherein the imaging pixels of the first type are configured in a first sub-array and the imaging pixels of the second type are configured in a second sub-array, and wherein the at least one processor is configured to receive output signals from the first sub-array and to produce a first image based at least partially on the output signals of the first sub-array, and wherein the at least one processor is further configured to receive output signals from the second sub-array and to produce a second image based at least partially on the output signals of the second sub-array.

23. The system of claim 22, wherein the at least one processor is further configured to process the first image and the second image to produce a combined image representing a combination of the first image and the second image.

24. A camera, comprising:
   an imaging array;
   readout circuitry coupled to the imaging array and configured to read out signals from the imaging array indicative of radiation incident on the imaging array; and
   processing circuitry configured to process the signals to form imaging data;
   wherein the imaging array comprises a plurality of imaging pixels comprising imaging pixels of at least two structurally different types, the at least two types comprising a first type and a second type;
   wherein the imaging pixels of the first type are configured to have a greater light sensitivity and a lower light saturation level than the imaging pixels of the second type;

wherein the imaging pixels of the first type and the second type comprise photodetectors that are substantially a same material and shape as each other and are integrated on a same substrate; and wherein the imaging pixels of the first type include respective microlenses configured to provide the imaging pixels of the first type with a greater optical fill factor than the imaging pixels of the second type.

25. The camera of claim 24, further comprising a housing in which the imaging array, readout circuitry, and processing circuitry are disposed.

26. The camera of claim 24, wherein the readout circuitry is integrated on the substrate.

27. The camera of claim 26, wherein the processing circuitry is integrated on the substrate.

28. The camera of claim 24, wherein the processing circuitry is configured to process the signals read out from the imaging array to form a first image based on signals output from the imaging pixels of the first type and a second image based on signals output from the imaging pixels of the second type.

29. The camera of claim 28, wherein the processing circuitry is further configured to process the first image and the second image to form a combined image representing a combination of the first image and the second image.

30. The array of imaging pixels of claim 4, wherein the first type of microlens has a first height greater than a second height of the second type of microlens.

* * * * *